(12) United States Patent
Yamada et al.

(10) Patent No.: US 9,461,290 B2
(45) Date of Patent: Oct. 4, 2016

(54) SEPARATOR

(71) Applicant: ASAHI KASEI FIBERS CORPORATION, Osaka-shi, Osaka (JP)

(72) Inventors: Yusuke Yamada, Tokyo (JP); Junichi Kusakabe, Tokyo (JP); Rumina Obi, Tokyo (JP); Shinichi Okajima, Tokyo (JP); Kazufumi Kato, Tokyo (JP)

(73) Assignee: ASAHI KASEI FIBERS CORPORATION, Osaka-Shi (JP)

( * ) Notice: Subject to any disclaimer, the term of this patent is extended or adjusted under 35 U.S.C. 154(b) by 0 days.

(21) Appl. No.: 14/390,248

(22) PCT Filed: Apr. 4, 2013

(86) PCT No.: PCT/JP2013/060333
§ 371 (c)(1),
(2) Date: Oct. 2, 2014

(87) PCT Pub. No.: WO2013/151134
PCT Pub. Date: Oct. 10, 2013

(65) Prior Publication Data
US 2015/0171397 A1 Jun. 18, 2015

(30) Foreign Application Priority Data
Apr. 4, 2012 (JP) .................. 2012-085692

(51) Int. Cl.
*H01M 2/16* (2006.01)
*H01M 10/0525* (2010.01)
(Continued)

(52) U.S. Cl.
CPC ........... *H01M 2/1686* (2013.01); *H01G 11/52* (2013.01); *H01M 2/162* (2013.01);
(Continued)

(58) Field of Classification Search
CPC ............. H01M 2/1686; H01M 2/162; H01M 10/0525; H01M 2220/20; H01M 2220/30
See application file for complete search history.

(56) References Cited

U.S. PATENT DOCUMENTS

2003/0180622 A1 9/2003 Tsukuda et al.
2010/0003588 A1 1/2010 Sudou et al.
(Continued)

FOREIGN PATENT DOCUMENTS

JP 7-290627 11/1995
JP 11-131355 5/1999
(Continued)

OTHER PUBLICATIONS

International Search Report from the Japanese Patent Office for International Application No. PCT/JP2013/060333, mailing date Jun. 11, 2013.
(Continued)

*Primary Examiner* — Muhammad Siddiquee
(74) *Attorney, Agent, or Firm* — Finnegan, Henderson, Farabow, Garrett & Dunner, L.L.P.

(57) ABSTRACT

Provided is a separator which shows excellent performance in electric insulation, electrolyte-holding property and ion- or electron-permeability and which can be stably manufactured. The separator is configured from a laminate non-woven fabric consisting of at least two layers, said layers including a non-woven fabric layer (layer I) that comprises a synthetic fiber having a fiber size of 0.1 μm or greater and less than 4.0 μm and a non-woven fabric layer (layer II) that comprises a thermoplastic resin fiber having a fiber size of 4.0-30.0 μm inclusive, and has a weight per area of 3.0 g/m² or greater and less than 20.0 g/m².

12 Claims, 2 Drawing Sheets

(51) Int. Cl.
*H01G 11/52* (2013.01)
*H01M 10/052* (2010.01)

(52) U.S. Cl.
CPC ....... *H01M10/0525* (2013.01); *H01M 2/1646* (2013.01); *H01M 10/052* (2013.01); *H01M 2220/20* (2013.01); *H01M 2220/30* (2013.01); *Y02E 60/13* (2013.01)

(56) References Cited

U.S. PATENT DOCUMENTS

| | | | |
|---|---|---|---|
| 2011/0262796 A1 | 10/2011 | Shimooka et al. | |
| 2011/0305941 A1* | 12/2011 | Park | H01M 2/162 429/145 |
| 2012/0141859 A1 | 6/2012 | Murata et al. | |
| 2012/0154985 A1* | 6/2012 | Kato | H01G 9/02 361/523 |
| 2012/0225358 A1* | 9/2012 | Seo | H01G 9/02 429/246 |

FOREIGN PATENT DOCUMENTS

| | | |
|---|---|---|
| JP | 11-283602 | 10/1999 |
| JP | 2001-126698 | 5/2001 |
| JP | 2005-159283 | 6/2005 |
| JP | 2011-528842 | 11/2011 |
| WO | WO 2008/018584 | 2/2008 |
| WO | WO 2010/134585 | 11/2010 |
| WO | WO 2011/021668 | 2/2011 |
| WO | WO 2011/027870 | 3/2011 |

OTHER PUBLICATIONS

Notification of Transmittal of Translation of the International Preliminary Report on Patentability, International Preliminary Report on Patentability, and Translation of the Written Opinion of the International Searching Authority, for International Patent Application No. PCT/JP2013/060333, mailed Oct. 16, 2014 (10 pages).
Supplementary European Search Report from the European Patent Office for EP 13772505.7, mailing date Feb. 27, 2015.
Office Action in EP Patent Application No. 13772505.7 dated Mar. 19, 2015.

* cited by examiner

SEPARATOR

TECHNICAL FIELD

The present invention relates to a separator that uses a laminated nonwoven fabric having a specific configuration. More particularly, the present invention relates to a separator for an electrochemical cell in the manner of a primary battery, secondary battery or fuel cell, and to a separator for an electrical energy storage device.

In the present description, an electrochemical cell can be interpreted as referring to all types of primary batteries and secondary batteries, and particularly those of the alkaline metal type such as lithium, lithium ion, lithium polymer and alkaline earth-type primary and secondary batteries.

An electrical energy storage device can be interpreted as referring to an electric double-layer capacitor, and particularly a lithium ion capacitor.

BACKGROUND ART

Energy storage devices such as batteries or capacitors are being required to demonstrate higher functionality with respect to high energy density, high reliability and the like accompanying the reduced size and higher efficiency of electronic equipment in recent years.

An example of energy storage devices that have attracted particular attention are lithium ion secondary batteries. Lithium ion secondary batteries have characteristics such as nigh voltage, high energy density, long life and rapid charging speed. Lithium ion secondary batteries are already currently used in compact electronic devices such as cell phones, smartphones or laptop computers, and are expected to be used in large electronic equipment focusing primarily on vehicle-mounted applications such as electric vehicles or hybrid vehicles in the future.

Lithium ion secondary batteries are typically composed of a positive electrode active material, negative electrode active material, electrolytic solution (electrolytic solution/electrolyte/additive) and separator.

The role of the separator can be broadly classified into two roles. The first is to prevent the two electrodes having different charged states from physically making direct contact, (short-circuiting). As a result, a high level of safety can be realized and high reliability can be imparted to the finished product. In order to accomplish this, required properties of the separator consist of having adequate mechanical strength and not causing short-circuits during voltage loading. In order to prevent the occurrence of short-circuiting, the separator is required to have a fine fibril structure or uniform network structure. The second role of the separator is to ensure ionic conductivity between the positive electrode and negative electrode while retaining the electrolytic solution. With respect to this role, the separator is required to have high ionic conductivity in order to realise high capacity and high output. Other separator required properties consist of reduced overall thickness and the presence of numerous void portions inside the separator.

Examples of separators currently being used include porous films and nonwoven fabrics. These materials have the aforementioned properties of, for example, high mechanical strength, fine network structure, suitable thickness and numerous void portions. Consequently, they allow the production of highly reliable, high-performance lithium ion batteries.

A polyolefin-based porous film is an example of a porous film separator that is widely used for the separators of lithium ion secondary batteries. The porosity thereof is comparatively high and it is able to realise high rate characteristics. In addition, porous film separators also demonstrate a so-called shutdown effect, whereby safety is maintained by sacrificing battery performance by enabling microvoids to melt and close up when an excessively large current flows at a high temperature of 130° C. to 180° C., thereby enabling them to be used as separators for lithium ion secondary batteries.

On the other hand, separators composed of nonwoven fabric demonstrate high electrolyte retention, high battery rate characteristics and superior voltage retention rate due to their high porosity. In addition, they also offer the advantages of light weight and compatibility with large-volume production. They can also be expected to demonstrate high resistance effects by forming a resin having superior heat resistance. Moreover, since pore diameter can be controlled by controlling fiber diameter, numerous studies have been conducted on separators composed of nonwoven fabric Patent Document 1 discloses an attempt to use a wet nonwoven fabric, in which heat-resistant fibers composed of a resin having a melting point or carbonization temperature of 300° C. or higher are immobilized by a thermoplastic resin, as a separator.

Patent Document 2 discloses an attempt to use a polyolefin-based fiber, which has a laminated three-layer structure consisting of an intermediate layer in the form of a nonwoven. fabric layer composed of micro fibers having a basis weight of 20 g/m$^2$ or more and average fiber diameter of 5 μm or more, and upper and lower layers in the form of nonwoven fabric layers having an average fiber diameter of 5 μm to 20 μm, and is subjected to hydrophilic treatment, as a separator.

Uniformity of the thickness of a nonwoven fabric is important for ensuring uniformity of the chemical reaction when using the nonwoven fabric as a separator. In Patent Document 2, uniformity is realized by providing a melt-blown nonwoven fabric having high film uniformity for the intermediate layer of a nonwoven fabric typically having low film uniformity in the form of a spunbonded layer. However, since the uniformity of the spunbonded nonwoven fabric remains low, there are concerns over decreases in electrolyte mobility and properties of the electrolytic solution.

In Patent Document 3, an attempt is made to improve electrolytic solution retention by using a laminated nonwoven fabric obtained by laminating a melt-blown nonwoven fabric having an average fiber diameter of 0.5 μm to 3 μm and smoothing the surface thereof.

In addition, studies have also been conducted on methods for further improving separator performance. For example, Patent Document 4 discloses a separator in which insulating particles are coated on a porous base material as a technology for preventing short-circuiting caused by thermal contraction of the separator.

PRIOR ART LITERATURE

Patent Literature

Patent Document 1: JP-A-2005-159283
Patent Document 2: JP-A-H11-283602
Patent Document 3: WO2008/018584
Patent Document 4: WO2010/024559

SUMMARY OF THE INVENTION

Problems to be Solved by the Invention

As can be seen in the aforementioned patent documents, attempts have been made thus far to demonstrate suitable ionic conductivity or ensure safety by preventing short-circuiting in separators for use in lithium ion secondary batteries. However, products using separators composed of nonwoven fabric are not widely used practically. The reason for this is that these separators are unable to demonstrate adequate performance with respect to mechanical strength, electrolytic solution retention or electrical insulating properties and the like for use as a separator, and are unable to realize satisfactory battery performance with respect to high capacity and high output.

In addition, since Patent Document 4 uses a single-layer nonwoven fabric composed of fibers having a large fiber diameter, the pore diameter of the nonwoven fabric becomes large and coating defects such as pinholes occur easily during inorganic coating consisting of coating inorganic particles in coating a slurry for forming an insulating layer. Although short-circuiting can be inhibited by coating a suitable amount of this slurry onto the nonwoven fabric during this inorganic coating, ion permeability decreases and discharge capacity at high rates is presumed to decrease. Conversely, if the pore diameter of the nonwoven fabric is excessively small, in the case of a nonwoven fabric composed of a single layer, the inorganic particles are unable to fill the inside of the nonwoven fabric resulting in the formation of voids. If an excess number of voids are present inside the inorganic coated nonwoven fabric, namely inside the separator, uniformity of the cell reaction decreases or internal short-circuiting is induced, during battery use.

With the foregoing in view, an object of the present invention is to provide a separator that can be used in an electrochemical cell, such as a primary battery, secondary battery or fuel cell, or in an electrical energy storage device, can be stably produced, and has superior electrical insulating characteristics, electrolyte retention and ionic conductivity.

Means for Solving the Problem

As a result of conducting extensive studies to solve the aforementioned problems, the inventors of the present invention found that a laminated nonwoven fabric having two or more layers and having different specific fiber diameters can provide superior performance in terms of electrical insulating properties, electrolyte retention and ion or electron permeability, that it has a structure that allows coated particles to be preferably retained within the nonwoven fabric when undergoing inorganic particle coating treatment, and that the use thereof allows the obtaining of an electrochemical cell or electrical energy storage device having higher performance, thereby leading to completion of the present invention. Namely, the present invention is as described below.

[1] A separator composed of at last two layers of laminated nonwoven fabric comprising:
a nonwoven fabric layer (layer I), composed of synthetic fibers having a fiber diameter of 0.1 μm to less than 4.0 μm, and
a nonwoven fabric layer (layer II), composed of thermoplastic resin fibers having a fiber diameter of 4.0 μm to 30 μm;
wherein, the basis weight thereof is 3.0 g/m² to less than 20.0 g/m².

[2] The separator described in [1], wherein the layer I is present as an intermediate layer between two of the layers II.

[3] The separator described in [1], wherein the layer II is present as an intermediate layer between two of the layers I.

[4] The separator described in any of [1] to [3], wherein the thermoplastic resin fibers in the nonwoven fabric layer (layer II) are thermoplastic synthetic continuous long fibers.

[5] The separator described in any of [1] to [4], wherein the laminated nonwoven fabric is formed by integrating by chemical and/or thermal bonding.

[6] The separator described in any of [1] to [5], wherein the laminated nonwoven fabric has a thickness of 10 μm to 50 μm.

[7] The separator described in any of [1] to [6], wherein the nonwoven fabric layer (layer I) is formed by melt-blowing.

[8] The separator described in any of [1] to [7], wherein the ratio (i)/(ii) of the basis weight (i) of the nonwoven fabric layer (layer I) to the basis weight (ii) of the nonwoven fabric layer (layer II) in the laminated nonwoven fabric is 1/10 to 10/1.

[9] The separator described in. any of [1] to [3], wherein the laminated nonwoven fabric is composed of a nonwoven fabric laminate in which the coefficient of variation of the texture of the nonwoven fabric is less than 2.3.

[10] The separator described in any of [1] to [9], wherein the laminated nonwoven fabric is calendered.

[11] The separator described in any of [1] to [10], wherein the laminated nonwoven fabric is hydrophilized.

[12] The separator described in any of [1] to [11], wherein an inorganic material is compounded in the laminated nonwoven fabric.

[13] An electrochemical cell or energy storage device that uses the separator described in any of [1] to [12].

Effect of the Invention

The separator of the present invention has superior performance in terms of electrical insulating properties, electrolyte retention and ion or electron permeability, and can be stably produced.

EMBODIMENT FOR CARRYING OUT THE INVENTION

The following provides a detailed explanation of the present invention.

The present invention is a separator composed of at last two layers of laminated nonwoven fabric comprising a nonwoven fabric layer (layer I), composed of synthetic fibers having a fiber diameter of 0.1 μm to less than 4.0 μm and a nonwoven fabric layer (layer II), composed of thermoplastic resin fibers having a fiber diameter of 4.0 µm to 30 µm; wherein, the basis weight thereof is 3.0 g/m² to less than 20.0 g/m².

The separator of the present invention is a laminated nonwoven fabric that contains a nonwoven fabric layer (layer I) and a nonwoven fabric layer (layer II). More specifically, the laminated nonwoven fabric is a nonwoven fabric having at least two layers consisting of a nonwoven fabric layer (layer I) composed of microfibers having a fiber diameter of 0.1 µm to less than 4.0 µm, and a nonwoven fabric layer (layer II) composed of thermoplastic resin fibers having a fiber diameter of 4.0 µm to 30 µm. As a result, the separator of the present invention has superior mechanical strength and superior ion permeability. In addition, it also has high barrier properties and is effective in isolating both electrodes even when in the form of a thin film.

The nonwoven fabric layer (layer I) is composed of microfibers having a fiber diameter of 0.1 µm to less than 4.0 µm. Furthermore, in the present description, the term "microfibers" refers to fibers having a fiber diameter within the aforementioned range of 0.1 µm to less than 4.0 µm. Although layer I may contain fibers other than the aforementioned microfibers within a range that does not impair the effects of the present invention, it is typically composed only of the aforementioned microfibers. If the fiber diameter is less than 4 µm, since gaps between fibers of the nonwoven fabric are not excessively large, electrolytic solution easily enters the gaps between fibers and as a result thereof, the resulting battery separator has superior electrolytic solution retention. In addition, in this case, since the surface area per unit weight, or in other words, specific surface area, of the microfiber nonwoven fabric layer (layer I) is large in order to coat with a resin for hydrophilization or inorganic matter for controlling pore diameter, that effect can be demonstrated effectively. On the other hand, if the fiber diameter is 0.1 µm or more, the fibers can be formed comparatively easily and the formed fibers tend not to fluff or form lint due to surface friction and the like. In this sense, the fiber diameter of the nonwoven fabric layer (layer I) is preferably 0.1 µm to 3.8 µm, more preferably 0.2 µm to 3.0 µm and even more preferably 0.3 µm to 2.5 µm. Furthermore, fiber diameter as described in the present description can be evaluated by measuring the diameter of the fibers with a microscope.

When carrying out inorganic coating consisting of coating inorganic particles on the nonwoven fabric, as a result of the nonwoven fabric containing microfibers as previously described, loss of the nonwoven fabric layer due to friction in the coating step can be inhibited. Moreover, inorganic particles can be preferably filled inside the nonwoven fabric in order to inhibit inorganic particles from passing through (bypassing) the back of the nonwoven fabric layer (layer I) composed of microfibers during inorganic coating. Consequently, the separator of the present invention can be tightly packed with inorganic particles inside the laminated nonwoven fabric, and therefore can inhibit the occurrence of internal short-circuiting even if the separator has low basis weight. In addition, since electrolyte permeability is improved by reducing the coated amount of particles, a battery that uses the separator of the present invention is able to demonstrate improved battery performance. Namely, carrying out inorganic coating on the nonwoven fabric of the present invention allows the obtaining of a favorable inorganic coating layer. Since the separator of the present invention is able to inhibit the formation of pinholes caused by defective coating even in the case of a small coated amount, both safety and high performance can be ensured during separator use.

In addition, by employing a laminated structure in which the microfiber layer (layer I) is arranged between two layers of the nonwoven fabric layer (layer II) composed of thermoplastic resin, since the coated component can be preferably retained within the layer II due to the effect of the microfiber layer of inhibiting bypass during inorganic coating, different components can be coated in the upper and lower layers. Accordingly, different coated particles suitable for each component of a battery can be coated on the upper and lower layers.

The nonwoven fabric layer (layer II) is composed of thermoplastic resin fibers having a particle diameter of 4.0 µm to 30.0 µm. If the fiber diameter is 30 µm or less, fiber diameter is not excessively large and ion permeability tends not to be inhibited. Although the nonwoven fabric layer (layer II) may also contain fibers other than the thermoplastic resin fibers having a fiber diameter of 4.0 µm to 30.0 µm within a range that does not impair the effects of the present invention, it is typically composed only of thermoplastic resin fibers having a fiber diameter of 4.0 µm to 30.0 µm. Similar to the importance of fiber diameter in the aforementioned layer I, fiber diameter is also important in the layer II. If the fiber diameter of the fibers that compose layer II is 30.0 µm or less, surface smoothness becomes high, and in the case of laminating layer I and layer II so as to be in mutual contact, a more uniform layer arrangement is possible since the fibers that compose layer I can be arranged between the fibers that compose layer II with little unevenness in basis weight. Thus, fibers are more evenly distributed in the laminated nonwoven fabric. As a result, local short-circuiting between both electrodes, or so-called micro-short circuiting, can be inhibited. On the other hand, if the fiber diameter of the fibers that compose layer II is 4.0 µm or more, the laminated nonwoven fabric has adequate strength and mechanical strength tends to be stable. In this sense, the fiber diameter of fibers that compose layer II is preferably 5.0 µm to 28 µm, more preferably 6.0 µm to 25 µm and even more preferably 9.0 µm to 20 µm.

With respect to the separator of the present invention, the microfiber nonwoven fabric layer (layer I) can be provided inside or on the surface of the nonwoven fabric that composes the separator. Since fiber diameter is small in layer I, the gaps between fibers are small, the fibers are uniformly distributed and specific surface area is large. As a result of having the fiber layer of layer I, the separator demonstrates high barrier properties due to the dense structure thereof, enabling the fabrication of a separator having superior electrical insulating properties between electrodes. In addition, due to the large specific surface area of the microfibers, the separator has superior electrolytic solution retention and ion permeability.

In the present invention, as a result of arranging the microfiber nonwoven fabric layer (layer I) in contact with layer II, coating particles can be preferably filled inside the layer II as a result of the layer I inhibiting permeation of coating particles to the back side when carrying out inorganic coating treatment on the separator, thereby making it possible to have a more favorable coated form.

In the case of carrying out inorganic coating treatment in the present invention, the preferable range of the mean flow pore diameter of the nonwoven fabric is within the range of 1.5 µm to 20 µm. If the mean flow pore diameter, which indicates the denseness of the nonwoven fabric, is 1.5 µm or more, there is little risk of a decrease in air permeability of the nonwoven fabric, thereby preventing the occurrence of coating defects attributable to air bubbles entering during coating and remaining inside the nonwoven fabric without being evacuated therefrom, and subsequently becoming voids after drying. On the other hand, if the mean flow particle diameter is 20 µm or less, there is little risk of coating particles permeating to the back of the base material during inorganic coating and forming holes in the coated surface. The mean flow particle diameter is more preferably 3.0 µm to 13 µm and even more preferably 5.0 µm to 12 µm. Furthermore, mean flow particle diameter as described in the present description can be measured with the Perm-Porometer manufactured by PMI Corp.

In the present invention, the nonwoven fabric layer (layer II) composed of thermoplastic resin fibers can be provided as a supporting layer that reinforces the nonwoven fabric layer (layer I). In addition, since the nonwoven fabric layer (layer I) has comparatively low air permeability, there are concerns over increases in internal pressure within a battery. However, as a result of combining the nonwoven fabric layer (layer I) with the nonwoven fabric layer (layer II) having a comparative large fiber diameter, air permeability of the laminated nonwoven fabric can be improved and a separator can be obtained that has superior ion permeability. Moreover, since the nonwoven fabric layer (layer II) protects the nonwoven fabric layer (layer I) from deformation and damage caused by inferior mechanical strength in each of the processes used to produce the separator, electrochemical cell or capacitor and the like, production can be carried out stably at a low defect rate.

In the laminated nonwoven fabric, the layer I is essential for forming a dense structure, while the layer II is essential for further stabilizing the laminated nonwoven fabric (namely, by improving tensile strength, bending strength and surface wearability of the nonwoven fabric) and stably retaining the layer I in each step. For these reasons, a laminated fabric having the aforementioned layer I and layer II is advantageous for producing an electrochemical cell or capacitor having favorable performance.

In the present invention, a laminated nonwoven fabric composed of three layers is more preferable for producing a separator offering an even higher level of performance.

In a more preferable aspect, thereof, the laminated nonwoven fabric is composed of a three-layer structure composed of two types of layers, the fiber diameter of the microfibers of the nonwoven fabric layer (layer I) is 0.1 µm to less than 4.0 µm, and the fiber diameter of the thermoplastic resin fibers of the nonwoven fabric layer (layer II) is 4.0 µm to 30.0 µm.

In the present invention, the basis weight of the laminated nonwoven fabric used as a separator is 3.0 g/m$^2$ to less than 20 g/m$^2$. If the basis weight of the laminated nonwoven fabric is less than 20 g/m$^2$, in cases in which the separator is required to nave a constant thickness, fiber voids tend to be adequately secured without the basis weight of the laminated, nonwoven fabric becoming excessively large, ion or electron permeability can be increased, and a high-performance separator can be fabricated. In addition, if the basis weight of the laminated nonwoven fabric is 3.0 g/m$^2$ or more, the mechanical strength of a slit nonwoven fabric can be made to be high, resistance to tension and the like applied during winding after production or during use becomes stronger, and handling tends to be easier. Moreover, in order to maintain the function of the separator of preventing electrical short-circuiting during a runaway reaction, adequate puncture strength tends to be able to be secured. In this sense, the basis weight of the laminated nonwoven fabric is preferably 5 g/m$^2$ to 15 g/m$^2$.

In the present invention, the thickness of the laminated nonwoven fabric used as a separator is preferably 10 µm to 50 µm. If the thickness of the laminated nonwoven fabric is 10 µm or more, the strength when the nonwoven fabric when slit to a short width tends to become higher and the defect rate in the slitting step is low. In addition, if the thickness is 10 µm or more, isolation between electrodes can be adequately secured in the process for manufacturing a battery or capacitor, thereby making it possible to inhibit physical contact. On the other hand, if the thickness of the laminated nonwoven fabric is 50 µm or less, thickness when winding the electrodes and separator does not become excessively large, thereby making it possible to obtain a compact product for use as an electronic component. In this sense, the thickness of the laminated nonwoven fabric is more preferably 10 µm to 30 µm. Furthermore, thickness as described in the present description can be measured in compliance with JIS L-1906.

In a particularly preferable aspect thereof, the laminated nonwoven fabric has a basis weight of 5 g/m$^2$ to 15 g/m$^2$ and a thickness of 10 µm to 30 µm.

In the present invention, the apparent density of the laminated nonwoven fabric used as a separator is preferably 0.17 g/cm$^3$ to 80 g/cm$^3$. If the apparent density is lower than 0.17 g/cm$^3$, the amount of fiber of the nonwoven fabric tends to be excessively low and product defects occur due to breakage in the battery assembly step or inorganic coating step and the like. In addition, resistance to burrs formed on the electrodes also decreases, thereby resulting in increased susceptibility to the occurrence of local short-circuiting. On the other hand, if apparent density is higher than 0.8 g/cm$^3$, the amount of fiber becomes excessively high inside the laminated nonwoven fabric, and since the fibers serve as an element that inhibits electrolyte permeation, battery performance decreases. In this sense, apparent density is preferably 0.17 g/cm$^3$ to 0.8 g/cm$^3$, more preferably 0.20 g/cm$^3$ to 0.75 g/cm$^3$ and even more preferably 0.25 g/cm$^3$ to 0.70 g/cm$^3$.

In the laminated nonwoven fabric used as a separator in the present invention, the respective basis weights of the nonwoven fabric layer (layer I) and the nonwoven fabric layer (layer II) and the ratio of the basis weights of the nonwoven fabric layer (layer I) and the nonwoven fabric layer (layer II) are preferably within the ranges indicated below.

Namely, in the present invention, the basis weight of the nonwoven fabric layer (layer I) is preferably 0.1 g/m$^2$ to 18.0 g/m$^2$ and more preferably 0.5 g/m$^2$ to 10 g/m$^2$. If the basis weight of layer I is 0.10 g/m$^2$ or more, the distance between fibers is not excessively large, electrolytic solution tends to easily enter the gaps between fibers, and as a result thereof, a separator can be fabricated that has superior electrolytic solution retention. In addition, if the basis weight of layer I is 18.0 g/m$^2$ or less, the thickness of the entire laminated nonwoven fabric is easily set to a preferable range and the total thickness of the laminated nonwoven fabric is easily set to a preferable range.

In the present invention, the basis weight of the nonwoven fabric layer (layer II) is preferably 0.5 g/m$^2$ to 18.0 g/m$^2$ and more preferably 1.0 g/m$^2$ to 15.0 g/m$^2$. If the basis weight of layer II is 1.0 g/m$^2$ or more, an adequately uniform distance between fibers can be obtained for the layer I in the laminated nonwoven fabric. Namely, as was previously described regarding the provisions for fiber diameter, the fibers that compose layer I can be more uniformly arranged between the fibers that compose the layer II, and as a result thereof, fibers can be more uniformly distributed in the laminated nonwoven fabric. As a result, fiber diameter becomes uniform and short-circuiting can be inhibited. In addition, if the basis weight of layer II is 1.0 g/m² or more, the laminated nonwoven fabric has favorable strength, the winding step is stable, and the separator does not lose shape. On the other hand, if the basis weight of layer II is 15.0 g/m² or less, the thickness of the overall laminated nonwoven fabric is easily set to a preferable range.

The ratio of the basis weight (i) of the nonwoven fabric layer (layer I) to the basis weight (ii) of the nonwoven fabric layer (layer II) is not limited to that indicated below. However, in order to impart favorable strength to the laminated nonwoven fabric and form a dense structure having small gaps between fibers, the ratio (i/ii) between the basis weights of layer I and layer II (the total of each layer in the case, for example, layer II is present on both surfaces of the laminated nonwoven fabric or in the case layer II is present on two more layers of the layer I and/or layer II) is preferably 1/10 to 10/1. If the ratio (i)/(ii) is greater than 1/10, the layer I is easily formed evenly in the planar direction of the nonwoven fabric. If the ratio (i)/(ii) is less than 10/1, favorable strength is easily obtained for the entire laminated nonwoven fabric that prevents deformation during slitting, during winding and in a heat treatment step. The thicknesses and basis weights of the laminated nonwoven fabric and each nonwoven fabric layer that composes it are suitably selected within a range that enables the required thickness and basis weight to be secured for use as a separator.

In the present invention, the thermoplastic resin fibers in the nonwoven fabric layer (layer II) are preferably thermoplastic synthetic long fibers. In the present description, thermoplastic synthetic long fibers refer to continuous long fibers composed of a thermoplastic synthetic resin (polyalkylene terephthalate resin (such as PET, PBT or PTT) or a derivative thereof, polyolefin-based resin (such as PE or PP) or a derivative thereof, polyamide-based resin such as N6, N66 or N612 or a derivative thereof, polyoxymethylene ether resin (such as POM), polyketone-based resin such as PEN, PPS, PPO, polyketone resin or PEEK, thermoplastic polyimide resin such as TPI, or a copolymer or mixture composed mainly of these resins). Here, continuous long fibers refer to fibers as defined in JIS-L0222. A nonwoven fabric composed of thermoplastic synthetic long fibers is able to have adequate mechanical strength. In addition, a nonwoven fabric composed of thermoplastic synthetic long fibers is more resistant to the generation of lint and has strong wearability during slitting or when subjected to friction from the outside. An example of thermoplastic synthetic long fibers is the long fibers composed of crystalline resin to be subsequently described. On the other hand, in the case of using short fibers for the thermoplastic synthetic fibers, a mixture of the crystalline resin and a thermoplastic resin having a melting point lower than the crystalline resin can be used. Mixing may be carried out by mixing fibers composed of a single resin or two or more types of resins having different melting points may be contained in a single fiber. For example, sheath-core yarn can be used that is composed of a core and sheath in which the melting point of the thermoplastic resin of the sheath is lower than the melting point of the thermoplastic resin of the core. For example, sheath-core yarn can be used in which PET is used for the core and copolymer PET is used for the sheath.

Furthermore, a "crystalline resin" as described in the present description refers to a resin in which the degree of crystallization as measured with a differential scanning calorimeter (DSC) in the state of a nonwoven fabric is 10% or more. Measurement of the degree of crystallization with a DSC consists of calculating the heat of fusion (ΔH) under measurement conditions of a sample weight of 5 mg, ramp rate of 10° C./min and scanning temperature of 50° C. to 300° C. followed by determining the degree of crystallization (Xc). Xc is determined according to the equation indicated below.

$$Xc=(\Delta HTm-\Delta HTcc)/(\Delta H0)*100 \quad (1)$$

Here, Xc is the degree of crystallization (%), ΔHTm is the heat of fusion (J/g) at the melting point, ΔHTcc is the heat of crystallization (J/g) and ΔH0 is a value in the literature for the heat of fusion (J/g) when the degree of crystallization of the resin is 100%.

In the present invention, there are no particular limitations on the constituent material of the nonwoven fabric layer (layer I) provided it is fibers having a fiber diameter of 0.1 μm to 4.0 μm, and may be a thermoplastic resin or a material free of thermoplastic resin such as cellulose fibrils. Preferably, it is a thermoplastic resin in the same manner as the previously described nonwoven fabric layer (layer II). More specifically, an example thereof is a thermoplastic synthetic resin (polyalkylene terephthalate resin (such as PET, PBT or PTT) or a derivative thereof, polyolefin-based resin (such as PS or PP) or a derivative thereof, polyamide-based resin such as N6, N66 or N612 or a derivative thereof, polyoxymethylene ether-based resin (such as POM), polyketone-based resin such as PEN, PPS, PPO, polyketone resin or PEEK, thermoplastic polyimide resin such as TPI, or a copolymer or mixture composed mainly of these resins). The thermoplastic resin used to form the nonwoven fabric layer (layer I) is suitably selected according to the purpose of use.

Although the resins that form the nonwoven fabric layer (layer I) and nonwoven fabric layer (layer II) that compose the laminated nonwoven fabric may by the same substance or different substances, they are preferably the same substance for the purpose of forming the laminated nonwoven fabric more uniformly. In the case of forming layer I and layer II with a resin of the same substance, a nonwoven fabric having more uniform gaps between fibers is easily formed, thereby making it easier to inhibit short-circuiting in the case of using such a nonwoven fabric as a separator.

There are no limitations on the method used to produce each nonwoven fabric layer used in the present invention. However, the method used to product nonwoven fabric layer (layer II) is preferably a spunbonding method, dry method or wet method. In the case of using spunbonding, although there are no particular limitations thereon, in order to improve web uniformity, the use of a method consisting of charging the fibers with a corona discharge device and the like as disclosed in, for example, JP-A-H11-131335 to improve uniformity of the web, or a method consisting of adjusting the velocity distribution of an air flow at the blowing portion of an ejector using a device capable of controlling air flow in the manner of a plate-shaped, dispersion plate, followed by blowing on the web after opening up the fibers and laminating on a collecting surface while inhibiting dispersion of the web, results in a more preferable production method. In addition, the production method of the nonwoven fabric layer (layer I) is preferably a dry type or wet type production method, or a method such as electrospinning, melt blowing or centrifugal spinning can be used. The nonwoven fabric layer (layer I) is particularly preferably formed by melt blowing from the viewpoint of being able to form the nonwoven fabric layer easily and densely. In addition, fibers may be used to produce the nonwoven fabric after having been split or fibrillated by beating or partial melting and the like.

Examples of methods used to form the laminated nonwoven fabric by laminating the nonwoven fabric layer (layer I) and the nonwoven fabric layer (layer II) composed of thermoplastic resin fibers include a method consisting of integrating with a particulate or fibrous adhesive, a method consisting of integrating by thermal bonding, and a method consisting of three-dimensional entanglement by spraying with a high-speed water flow.

A method used to form the laminated nonwoven fabric by integrating by chemical bonding specifically uses a binder adhesive, thermoplastic adhesive and/or chemical binder. These adhesives and binder are partially melted in the web production step or subsequent step, enabling the fibers to mutually bond and yield a laminated nonwoven fabric having adequate mechanical strength for use as a separator.

A particularly preferable method in terms of forming a laminated nonwoven fabric consists of integrating by thermal bonding. Examples of methods of integrating by thermal bonding include integrating by thermal embossing (thermal roll embossing system) and integrating by blowing high-temperature hot air (air through system). Integration by thermal bonding is preferable from the viewpoints of maintaining tensile strength, bending flexibility and puncture strength of the nonwoven fabric and maintaining heat-resistance stability.

Integration by thermal bonding can be realized by thermobonding two or more nonwoven fabric layers. The thermobonding step can be carried out by, for example, joining the nonwoven fabric layers using a flat roll at a temperature 10° C. to 120° C. lower than the melting point of the thermoplastic resin (and preferably thermoplastic resin long fibers) and at a linear pressure of 100 N/cm to 1000 N/cm. If the linear pressure in the thermobonding step is less than 100 N/cm, adhesion is inadequate and there are cases in which it is difficult to impart adequate strength. In addition, if the linear pressure exceeds 1000 N/cm, deformation of the fibers becomes large, apparent density increases and there are cases in which it becomes difficult to obtain the effects of the present invention.

The most preferable method consists of sequentially producing melt-blown nonwoven fabric layers or spunbonded nonwoven fabric layers, laminating these layers and pressing together with a hot press roll. This method is preferable in the case of desiring to obtain a uniform nonwoven fabric of low basis weight since a laminated nonwoven fabric can be formed with the same material and can be produced on a continuous integrated production line.

In addition, if unevenness is present in the distribution of fibers that form the laminated nonwoven fabric, disparities occur in the mobility of lithium ions and other electrolytes that pass through the laminated nonwoven fabric when using as a battery separator. Disparities in electrolyte mobility cause uniformity of the battery reaction to be impaired, thereby leading to micro-short-circuiting during charging and discharging or decreases in battery performance. Accordingly, uniformity of the distribution of fibers of the nonwoven fabric greatly contributes to performance of the battery separator.

The coefficient of variation of texture can be used as an indicator of nonwoven fabric uniformity. The preferable range of the coefficient of variation of texture is less than 2.3, and in the case the coefficient of variation of texture exceeds 2.3, not only does battery performance decrease when the laminated nonwoven fabric is used as a separator, but there are also cases in which short-circuiting occurs during charging and discharging. A more preferable range for demonstrating favorable battery performance is less than 2.0 and an even more preferable range is less than 1.7.

Furthermore, the coefficient of variation of texture is defined in the manner indicated below.

The coefficient of variation of texture is measured with a formation tester (FMT-MIII). A test piece measuring 20 cm×30 cm is sampled and placed on a dispersion plate followed by irradiating with light with a tungsten current at a direct current low voltage (6 V, 30 W) from below the sample. Transmission images captured with a CCD camera over a range of 18 cm×25 cm are resolved into 128×128 pixels and the intensity of light received by each pixel is measured followed by calculation of transmittance. The coefficient of variation of texture is the value obtained by dividing the standard deviation ($\sigma$) of the transmittance of each microregion (5 mm×5 mm) of the measurement sample by the average transmittance (E) (refer to equation below), this is used as the most direct evaluation of minute variations in basis weight, and the smaller the value thereof, the higher the degree of uniformity.

$$\text{Coefficient of variation of texture} = \sigma/E \times 100$$

In cases in which the sample size is excessively small and a test piece of the aforementioned dimensions cannot be sampled, a test piece cut to arbitrary dimensions is laminated into a nonwoven fabric having similar optical transmittance cut out to similar dimensions, and after measuring transmission images over a range of 18 cm×25 cm, the coefficient of variation of texture can be obtained by extracting the optical transmittance at the site of the test piece only.

Use of the aforementioned production method makes it possible to integrate each laminated nonwoven fabric layer with an embossing roll or flat roll by applying a suitable temperature and pressure. Moreover, comparatively thin fibers obtained by melt blowing can be allowed to penetrate into a layer composed of comparatively thick thermoplastic resin fibers (and preferably a thermoplastic synthetic long fiber nonwoven fabric layer). In this manner, fibers obtained by melt blowing can be immobilized by allowing to penetrate into a layer composed of thermoplastic resin fibers (and preferably a thermoplastic synthetic long fiber nonwoven fabric layer). As a result, not only does the strength of the structure per se of the laminated nonwoven fabric improve, since the nonwoven fabric layer (layer I) is resistant to being shifted by external force, voids in the nonwoven fabric layer (layer II) composed of thermoplastic resin fibers (and preferably a thermoplastic synthetic long fiber nonwoven fabric layer) are filled in by the layer I, thereby making it possible to construct a uniform network. It also becomes easy to form a laminated nonwoven fabric capable of securing a suitable distance between fibers as previously described as well as have a suitable pore diameter distribution. In other words, according to the aforementioned method, since a continuous layer I can be maintained while allowing a portion of the layer I to be positioned under the layer II in the laminated nonwoven fabric, diffusion and retention of electrolytic solution on the surface of the nonwoven fabric become uniform and a high-performance separator can be fabricated.

The degree of crystallization of fibers formed by melt blowing (or in other words, melt-blown fibers) can be adjusted within the range of 5% to 40% under ordinary melt-blown spinning conditions. Furthermore, degree of crystallization can be evaluated, for example, with a method that uses a DSC as previously described. More specifically, the aforementioned degree of crystallization can be realized by using a resin, such that the solution viscosity (ηsp/c) as measured using a viscosity tube in a constant-temperature water bath having a concentration of 0.01 g/mL and temperature of 35° C. when using o-chlorophenol (COP) for the solvent is preferably 0.2 to 0.8 and more preferably 0.2 to 0.6, for the polymer that forms the nonwoven fabric layer. From the viewpoint of high dimensional stability being preferable when wet, in the nonwoven fabric used in the present invention, the nonwoven fabric is preferably composed of melt-blown fibers using PET resin and/or PPS resin having a solution viscosity (ηsp/c) of 0.2 to 0.8. The degree of crystallization of the melt-blown fibers is more preferably 10% to 40%.

In the present invention, the laminated nonwoven fabric is preferably calendered. In this case, a more uniform structure can be imparted to the laminated nonwoven fabric. More specifically, in the case of joining the fibers using the previously described thermobonding step, calendering processing treatment is carried out a temperature that is 10° C. or more higher than the previously described thermobonding temperature and 10° C. to 100° C. lower than the melting point of the thermoplastic resin fibers (and preferably thermoplastic resin long fibers), and at a linear pressure of 100 N/cm to 1000 N/cm. As a result of carrying out the aforementioned calendering processing, favorable strength is obtained by the laminated nonwoven fabric and apparent density can be made to be within a particularly preferable range (for example, within the range described in the examples of the present description).

In the case the calendering treatment temperature is lower than the melting point of the thermoplastic resin fibers (and preferably thermoplastic resin long fibers) and the difference therewith is less than 10° C., apparent density tends to become excessively high, while in the case the calendering treatment temperature is lower than the melting point of the thermoplastic resin fibers (and preferable thermoplastic resin long fibers) and the difference therewith exceeds 100° C., it tends to be difficult to obtain adequate Strength.

If the linear pressure during calendering processing treatment is less than 100 N/cm, it is difficult to obtain adequate adhesion and it tends to be difficult to demonstrate adequate strength. In addition, if the linear pressure exceeds 1000 N/cm, fiber deformation becomes large and apparent density becomes high, thereby resulting in cases in which it becomes difficult to obtain the effects of the present invention.

Mechanical strength of a fixed value or higher is preferably imparted from the viewpoints of process performance during battery fabrication and inhibiting short-circuiting of the battery.

A preferable range of tensile strength is 2.5 N/1.5 cm or more and a more preferable range is 5 N/1.5 cm or more. An even more preferable range is 8 N/1.5 cm or more, and a particularly preferable range is 10 N/15 mm. If tensile strength is within these ranges, it becomes difficult for breakage of the separator to occur when winding the battery.

A preferable range of puncture strength is 100 g or more, and a more preferable range is 150 g or more. An even more preferable range is 200 g or more. In the case puncture strength is 50 g or more, it becomes difficult for metal precipitates within the battery and burrs on the positive and negative electrodes to cause rupturing of the film, thereby making it difficult for internal short-circuiting to occur.

In the case strength is particularly required in a step when producing a battery or during inorganic coating treatment, a structure is preferable in which the microfiber layer (layer I) is arranged between fiber layers (layer II) composed of thermoplastic resin. In the case of nonwoven fabric having low basis weight as in the present invention, it is difficult to retain high strength with the microfiber layer alone. By arranging layer I between layers II, a nonwoven fabric of higher strength can be obtained since layer I fulfills the role of an adhesive layer.

In the present invention, the laminated nonwoven fabric is preferably hydrophilized. When the laminated nonwoven fabric is subjected to hydrophilic treatment, liquid retention of the nonwoven fabric improves and electrolytic solution required for the battery reaction is easily retained, thereby making it possible to fabricate a separator that demonstrates a higher level of performance. Examples of hydrophilic treatment methods employed include physical processing methods such as hydrophilization by corona treatment or plasma treatment, chemical processing methods such as the introduction of surface functional groups (such as the introduction of a sulfonic acid group or carboxylic acid group in oxidation treatment), and processing methods using a treatment agent such as a water-soluble polymer (such as PVA, polystyrene sulfonate or polyglutaminic acid) or surfactant (such as a nonionic surfactant, anionic surfactant, cationic surfactant or amphoteric surfactant). The amount of treatment agent used or the amount of functional groups introduced and the like can be selected based on affinity with the monomer and so forth used to form a solid electrolyte. However, since hydrophilized laminated nonwoven fabric has the potential to easily retain moisture in the future, the processing amount (weight of the aforementioned treatment agent or introduced functional groups relative to the weight of the laminated nonwoven fabric) is preferably 3% by weight or less.

In the present invention, an inorganic composite material is more preferably compounded on the laminated nonwoven fabric. For example, an inorganic composite material can be compounded using the method disclosed in WO 2010-134585. A separator containing an inorganic composite material on the laminated nonwoven fabric has a suitable pore diameter and enables pore diameter to be controlled within the range of 0.1 μm to 10 μm. If pore diameter is within this range, micro-short-circuiting can be more effectively inhibited while retaining superior ion permeability, thereby allowing the fabrication of a high-performance separator. Examples of an inorganic composite material layer include porous layers composed of a material, that occludes micropores in an organic layer and melts at a prescribed temperature on an inorganic coating having oxide particles of the elements Al, Si and/or Zr and having a mean particle diameter of 0.5 μm to 10 μm, and is present in the form of a porous planar structure on the laminated nonwoven fabric. Examples of techniques used to compound inorganic materials in the nonwoven fabric include impregnation, transfer and coating.

Specific examples of such inorganic particles are indicated, below, and one type thereof may be used alone or two or more types may be used in combination. Examples of inorganic particles include oxide fine particles such as iron oxide, $SiO_2$ (silica), $Al_2O_3$ (alumina), $TiO_2$, $BaTiO_2$ or ZrO, nitride fine particles such as aluminum nitride or silicon nitride, poorly soluble ionic crystalline fine particles such as calcium fluoride, barium fluoride or barium sulfate, covalently bonded crystalline fine particles such as silicon or diamond, clay fine particles such as talc or montmorillonite, mineral resource-derived substances or artificial forms thereof such as boehmite, zeolite, apatite, kaolin, mullite, spinel, olivine, sericite, bentonite or mica. In addition, the inorganic particles may also be fine particles that have been given electrical insulating properties by coating the surface of electrically conductive fine particles, such as metal fine particles, oxide fine particles such as $SnO_2$ or indium tin oxide (ITO) or carbonaceous fine particles such as carbon black or graphite, with a material having electrical insulating properties (such as materials that compose the aforementioned non-electrically conductive inorganic fine particles).

When carrying out inorganic coating treatment, a slurry is used that is obtained by mixing in a binder, heat-fusible fine particles and the like in addition to the aforementioned inorganic particles and dissolving or dispersing these in a solvent. Although the solvent used in the slurry is that which is able to uniformly disperse inorganic fine particles or heat-fusible fine particles and the like as well as uniformly dissolve or disperse the binder, an organic solvent is preferable, and examples thereof include aromatic hydrocarbons such as toluene and ketone such as methyl ethyl ketone or methyl isobutyl ketone. Furthermore, an alcohol or propylene oxide-based glycol ether and the like may be suitably added to these solvents for the purpose of controlling surface tension. In addition, in the case the binder is water-soluble or in the case of using in the form of an emulsion, water may be used for the solvent, and in this case as well, surface tension can be controlled by suitably adding an alcohol.

Although an inorganic coated nonwoven fabric separator can be fabricated by preparing a liquid composition in the form of a slurry and the like by dispersing in water or a suitable solvent by further using heat-fusible fine particles or a binder as necessary for the aforementioned slurry, and using a conventionally known coating device such as a blade coater, roll coater, die coater or spray coater, there are no particular limitations on the coating method.

Figure 1:
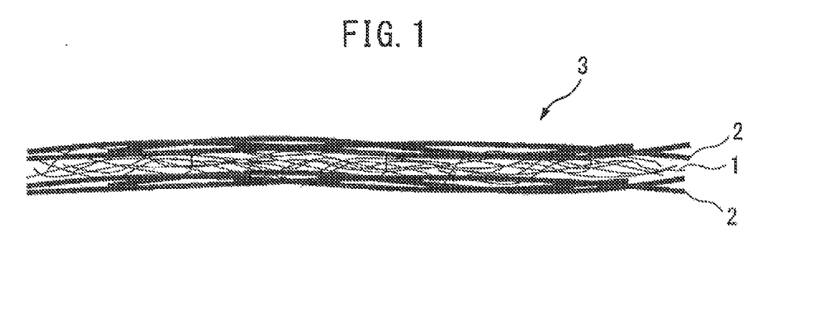
FIG. 1 is a conceptual drawing showing a laminated nonwoven fabric having a three-layer structure.

FIG. 1 is a conceptual drawing showing a laminated nonwoven fabric having a three-layer structure.

Figure 2:
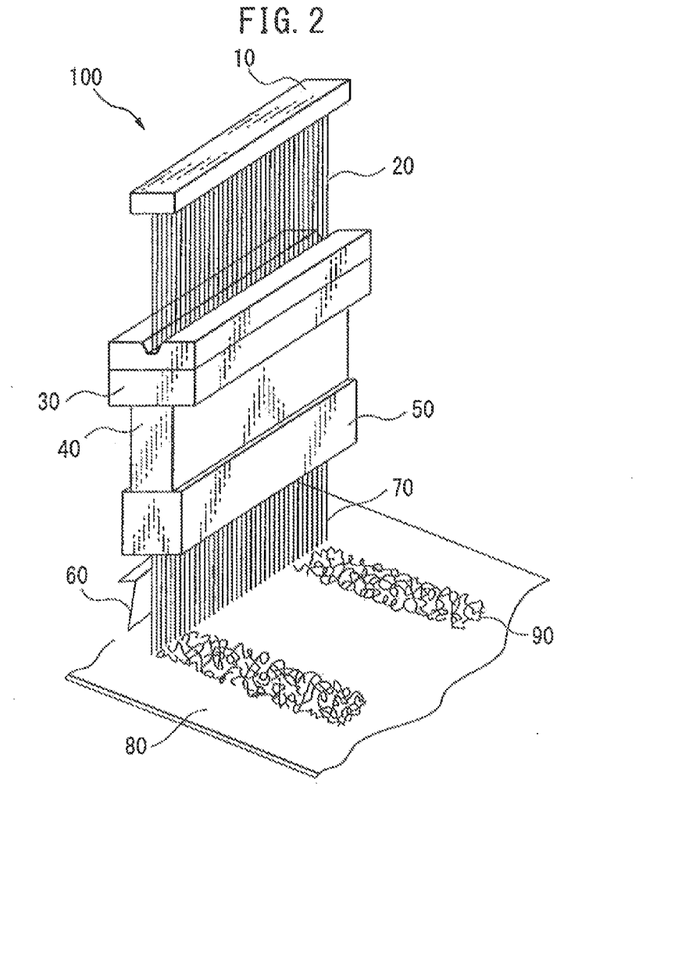
FIG 2 is a schematic diagram of an apparatus for producing a spunbonded nonwoven fabric used in an embodiment of the present invention.
Figure 3:
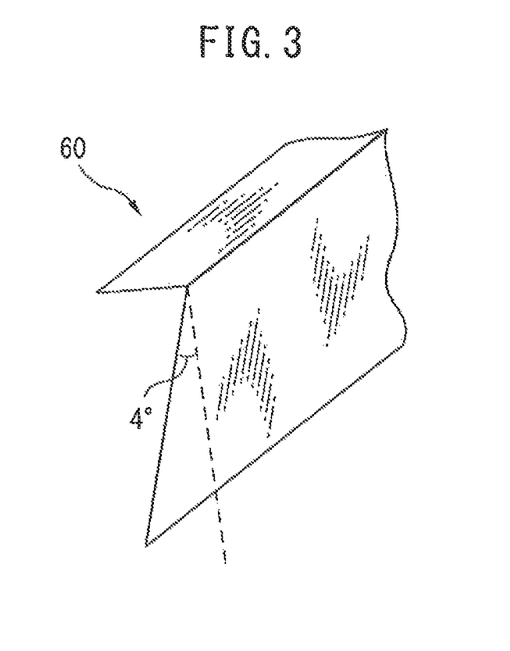
FIG. 3 is an enlarged view of a portion of the apparatus of FIG. 2 used in an embodiment.

FIG. 2 is a schematic diagram of an apparatus 100 for producing a spunbonded nonwoven fabric used in an embodiment of the present invention. This apparatus is composed of spinnerets 10 having a width equivalent to the production width of the nonwoven fabric, air aspirators 30 introduced with a filament group 20 expelled from the spinnerets, channels 40 consecutively connected in order between the air aspirators 30 without providing gaps there between a corona charging channel device 50 and a dispersion plate 60. In this configuration, the filament group 20 expelled from the spinnerets 10 are sent to the corona charging channel device 50 through the air aspirators 30 and the channels 40 where it is charged by corona discharge followed by being deposited on a collecting surface 80 and forming a web 90. At this time, by controlling the air flow using the dispersion plate 60, the fiber group is opened and dispersed by the flow of static electricity and air, thereby enhancing uniformity of the web. FIG. 3 is an enlarged view of the dispersion plate 60 of FIG. 2. In the Examples 22 to 50 to be subsequently described, a dispersion plate is used inclined at an angle of 4° with respect to charging filaments 70 protruding vertically from the corona charging channel device 50.

EXAMPLES

Although the following provides an additional explanation of the present invention by indicating examples thereof, the present invention is not limited to these examples. Furthermore, the measurement methods and evaluation methods used were as described below. Unless specifically indicated otherwise, the lengthwise direction of the nonwoven fabric is the machine direction (MD), while the widthwise direction is the direction perpendicular to the lengthwise direction.

Examples 1 to 11

Laminated nonwoven fabrics of Examples 1 to 11 were fabricated according to the method described below followed by an evaluation of their performance.

In order to obtain a microfiber web for the microfiber nonwoven fabric layer (layer I), spinning was carried out by melt blowing by expelling towards a moving collecting surface using a PET solution (using OCP for the solvent and having a solution viscosity ηsp/c of 0.50 as measured at a temperature of 35° C.) under conditions of a spinning temperature of 300° C. and hot air flow of 1000 $Nm^3$/hr/m. At this time, the distance from the melt blowing nozzles to the microfiber web was set to 100 mm, the suction force on the collecting surface directly beneath the melt blowing nozzles was set to 0.2 kPa and the blowing velocity was set to 7 m/sec. Adjustment of fiber diameter and degree of crystallization were carried out by adjusting the hot air volume.

Next, in order to obtain a nonwoven fabric layer (layer II) composed of thermoplastic resin fibers, a filament group was spun at a spinning speed of 4500 m/min using a solution of general-purpose PET (as thermoplastic resin) (using OCP for the solvent and having a solution viscosity ηsp/c of 0.67 as measured at a temperature of 35° C.) (solution viscosity was measured with a viscosity tube in a constant-temperature water bath at a temperature of 35° C., to apply similarly hereinafter) by spunbonding at a spinning temperature of 300° C., followed by blowing onto the microfiber web. Next, the fibers were charged at about 3 μC/g by corona charging to adequately open the filament group and obtain a laminated web consisting of a nonwoven fabric layer (layer I) composed of microfibers and a nonwoven fabric layer (layer II) composed of thermoplastic resin long fibers. Adjustment of fiber diameter was carried out by changing traction conditions.

Moreover, the nonwoven fabric layer (layer I) was laminated on the laminated web obtained as described above to a prescribed fiber diameter and basis weight using the same method as that used to form the microfiber web in the form of the aforementioned nonwoven fabric layer (layer I). As a result, a laminated web was obtained consisting of layer I, layer II and layer 1. After thermobonding the resulting laminated web with a flat roll under the conditions shown in Table 1, thickness was adjusted to a desired thickness with a calender roll together with apparent density to obtain a laminated nonwoven fabric. Various types of nonwoven fabrics were then obtained under the aforementioned basic conditions while changing the processing conditions (Examples 1 to 11). The configuration and forming conditions of the resulting laminated nonwoven fabrics are shown in Table 1.

Example 12

A melt blown fiber web to serve as a nonwoven fabric layer (layer I) was fabricated in the same manner as Example 1 for use as the nonwoven fabric layer (layer I), and snort fibers having a co-PET/PET sheath-core structure and having a fiber diameter of 18 μm and fiber length of 5 mm were obtained for use as the nonwoven fabric layer (layer II). More specifically, after collecting on a net at 30 g/$m^2$ by a sheet forming method, dehydrating and drying, the fibers were fused by an air nozzle system (180° C., 5 m/min) to obtain a nonwoven fabric layer (layer I) and short fiber web (layer II). Moreover, a nonwoven fabric layer (layer I) fabricated in the same manner as Example 1 was laminated on the web obtained in the manner described above to obtain a laminated web composed of three layers. The resulting laminated web was thermobonded with a flat roll and calender roll to obtain a laminated nonwoven fabric. The configuration and forming conditions of the laminated nonwoven fabric are shown in Table 1. Furthermore, in Table 1, the melting points of the short fibers of the sheath-core structure are indicated in the order of sheath followed by core (to apply similarly hereinafter).

Example 13

PPS (Fortron manufactured by Polyplastics Co., Ltd.) was used for the thermoplastic resin. The conditions used to form a nonwoven fabric are as indicated below.
Layer I: resin melt viscosity: 670 g/10 min (measured in the same manner as previously described, measurement conditions: load 5 kg, temperature 315.6° C.), spinning temperature: 340° C., hot air temperature: 390° C., hot air flow: 1000 N/m$^3$/hr/m.
Layer II: resin melt viscosity: 70 g/10 min (measured using a capillary rheometer, measurement Conditions: load 5 kg, temperature 315.6° C.), spinning temperature: 320° C., spinning speed: 8000 m/min.
In addition, thermobonding conditions when using a flat roll consisted of a linear pressure of 260 N/cm and roll temperature of 150° C. for the upper roll and 150° C. for the lower roll, and calendering conditions consisted of a linear pressure of 350 N/cm and roll temperature of 70° C. for the upper roll and 70° C. for the lower roll. The conditions used to form the laminated nonwoven fabric and the performance thereof are respectively shown in Table 1. Other conditions were the same as in Example 1. In addition, electrical characteristics are shown in Table 4.

Example 14

PP (Japan Polypropylene Corp.) was used for the thermoplastic resin. The conditions used to form a nonwoven fabric are as indicated below.
Layer I: resin melt viscosity: 1500 g/10 min (measured in the same manner as previously described, measurement conditions: load 2.1 kg, temperature 230° C.), spinning temperature: 230° C., hot air temperature: 320° C., hot air flow: 1050 K/m$^3$/hr/m.
Layer II: resin melt viscosity: 43 g/10 min (measured using a capillary rheometer, measurement conditions: load 2.1 kg, temperature 230°, spinning temperature: 230° C., spinning speed: 3300 m/min.
In addition, thermobonding conditions when using a flat roll consisted of a linear pressure of 260 N/cm and roll temperature of 90° C. for the upper roll and 90° C. for the lower roll, and calendering conditions consisted of a linear pressure of 350 N/cm and roll temperature of 40° C. for the upper roll and 40° C. for the lower roll. The conditions used to form the laminated nonwoven fabric and the performance thereof are respectively shown in Table 1. Other conditions were the same as in Example 1. In addition, electrical characteristics are shown in Table 4.

Example 15

1000 g of water, 1000 g of inorganic fine particles in the form of spherical silica and a binder in the form SBR latex (parts by weight of SBR solid fraction to 100 parts by weight of inorganic fine particles) were placed in a container and dispersed by stirring for 1 hour with a three-one motor to obtain a uniform slurry. A nonwoven fabric obtained using the same method as Example 1 was passed through this slurry and lifted out to coat with the slurry followed by passing through a gap of a prescribed interval and drying at 100° C. to fabricate a separator.

Example 16

A laminated nonwoven fabric was fabricated using the same method as Example 15 with the exception of changing the amount of fiber and obtained by coating with an inorganic material using the same method as Example 15. The configuration and forming conditions of the laminated nonwoven fabric are shown in Table 1.

Example 17

Differing from Examples 1 to 11, a laminated nonwoven fabric having a two-layer structure (layer I and layer II) was obtained while the other conditions were the same as in Examples 1 to 11. The configuration and forming conditions of the resulting laminated nonwoven fabric are shown in Table 1.

Example 18

A laminated nonwoven fabric was fabricated using the same method as Example 17 and obtained by coating with an inorganic material having Si oxide particles using the same method as Example 15. The configuration and forming conditions of the resulting laminated nonwoven fabric are shown in Table 1.

Example 19

Differing from Examples 1 to 11, a laminated nonwoven fabric was obtained having a three-layer structure containing the microfiber layer 1 as an intermediate layer (layer II-layer I-layer II). The fabrication method consisted of forming layer II by spunbonding to obtain a web. Next, layer I was blown onto a web obtained by spinning by melt blowing on the layer II to obtain a laminated web composed of layer II and layer I. Moreover, the aforementioned nonwoven fabric layer (layer II) was laminated directly on the laminated web obtained in the above manner by forming using the same method, as that used to form the aforementioned nonwoven fabric layer (layer II). As a result, a laminated web was obtained consisting of layer II, layer I and layer II in that order. Subsequently, a laminated nonwoven fabric was fabricated using the same method as Example 1. The configuration and forming conditions of the resulting laminated nonwoven fabric are shown in Table 1.

Example 20

A laminated nonwoven fabric was fabricated using the same method as Example 19 and obtained by coating with an inorganic material having Si oxide particles using the same method as Example 15. The configuration and forming conditions of the resulting laminated nonwoven fabric are shown in Table 1.

Example 21

A laminated nonwoven fabric was fabricated using the same method as Example 19 with the exception of changing the amount of fiber and obtained by coating with an inorganic material having Si oxide particles using the same method as Example 15. The configuration and forming conditions of the resulting laminated nonwoven fabric are shown in Table 1.

Examples 22 to 41

Laminated nonwoven fabrics were fabricated in the same manner as Examples 1 to 11 and 13 to 21 with the exception of using a nonwoven fabric layer (layer I) composed of thermoplastic resin fibers, and charging the fibers at about 3 µC/g by corona charging followed immediately by using a dispersion device of a dispersion plate (angle of inclination of flat plate with respect to filaments: 4°) as shown in FIG. 3. The configuration and forming conditions of the resulting laminated nonwoven fabrics are shown in Table 2.

Examples 42 and 43

Laminated nonwoven fabrics were fabricated using the same method as Example 41 with the exception of changing calendering conditions. The configuration and forming conditions of the laminated nonwoven fabrics are shown in Table 2.

Example 44

A laminated nonwoven fabric was fabricated using the same method as Example 43 with the exception of changing the amount of fiber. The configuration and forming conditions of the laminated nonwoven fabric are shown in Table 2.

Examples 45 to 47

Laminated nonwoven fabrics were fabricated using the same method as Example 39 with the exception of changing the amount of fiber, fiber diameter and calendering processing conditions. The configuration and forming conditions of the laminated nonwoven fabrics are shown in Table 2.

Examples 48 to 50

Separators were fabricated by carrying out inorganic coating treatment on the nonwoven fabrics obtained in Examples 45 to 47 using the same method as Example 15. The configuration and forming conditions of the laminated nonwoven fabrics are shown in Table 2.

Comparative Example 1

A nonwoven fabric consisting only of nonwoven fabric layer (layer II) was obtained as an example by using a spunbonded nonwoven fabric manufactured by Asahi Kasei Fibers Corp, (EO5025, fiber diameter: 16 µm, basis Weight: 25 g/m$^2$) for the nonwoven fabric. The configuration of the nonwoven fabric is shown in Table 3.

Comparative Example 2

A microfiber nonwoven fabric layer (layer I) was formed using the same resin as in Example 1 by spinning by melt blowing and blowing onto a net under conditions of a spinning temperature of 300° C. and hot air flow of 1000 Nm$^3$/hr/m. At this time, the distance from the melt blowing nozzles to the web was set to 100 mm, the suction force on the collecting surface directly beneath the melt blowing nozzles was set to 0.2 kPa and the blowing velocity was set to 7 m/sec. Adjustment of fiber diameter and degree of crystallization was carried out by changing discharge volume to obtain a nonwoven fabric consisting only of layer I. The configuration and forming conditions of the nonwoven fabric are shown in Table 3.

Comparative Example 3

A laminated nonwoven fabric was laminated using the same method as Example 18 with the exception of changing the amount of fiber of each layer, and the total basis weight was 20 g/m$^2$.

Comparative Example 4

A web was obtained by collecting PET short fibers having a fiber diameter of 16 µm and fiber length of 5 mm on a net at 25 g/m$^2$ by a sheet forming method. Furthermore, a binder in the form of polyvinyl alcohol (melting temperature: 70° C.) was used to prevent the fibers from coming apart and maintain nonwoven fabric strength, bringing the overall basis weight to 33 g/m$^2$. After dehydrating and drying this web, the web was hot-pressed with a calender roll to obtain a nonwoven fabric consisting only of the nonwoven fabric layer (layer II). The configuration and forming conditions of the nonwoven fabric are shown in Table 3.

Comparative Example 5

A wet nonwoven fabric composed of rayon fibers (fiber diameter: 8 µm, basis weight: 16 g/m$^2$) was used for the nonwoven fabric. The configuration of the nonwoven fabric is shown in Table 3.

Comparative Example 6

A commercially available polyethylene microporous film (basis weight: 16 g/m$^2$, thickness: 25 µm, apparent density: 0.6 g/cm$^3$) was used.

Comparative Example 7

A short fiber nonwoven fabric was obtained using the same method as Comparative Example 4 with the exception of changing the amount of PET short fibers to 12 g/m$^2$ and changing the overall basis weight to 15 g/m$^2$.

Comparative Example 8

A short fiber nonwoven fabric was obtained using the same method as Comparative Example 4 with the exception of changing the amount of PET short fibers to 8 g/m$^2$ and changing the overall basis weight to 10 g/m$^2$.

Comparative Example 9

A short fiber nonwoven fabric was obtained using the same method as Comparative Example 8. Inorganic coating treatment was carried out on this nonwoven fabric using the same method as Example 15.

Characteristics of the separators fabricated in the aforementioned manner were evaluated as described below. Those results are shown in Tables 4 to 6. Furthermore, the measurement methods used to measure the fiber diameters and melting points described in Tables 1 to 3 are as described below (sections (4) and (8), respectively). Furthermore, the coefficient of variation of texture was measured using the previously described method.

(1) Basis Weight (g/m$^2$)

Test pieces measuring 20 cm wide×25 mm long were sampled at 3 locations per meter in the widthwise direction of the sample and at 3 locations per meter in the lengthwise direction for a total of 9 locations per 1 m×1 m in accordance with JIS L-1906, followed by measurement of weight and determination the average value thereof after converting to weight per unit area.

(2) Thickness (mm)

The thicknesses at 10 locations per 1 m of width were measured followed by determination of the average value thereof in accordance with the provisions of JIS L-1906. Measurements were carried out at a load of 9.8 kPa.

(3) Apparent Density (g/cm$^3$)

Apparent density was calculated according to the equation below using the basis weight (g/m$^2$) measured in (1) above and the thickness (μm) measured in (2) above.

Apparent density=(basis weight)/(thickness)

(4) Fiber Diameter (μm)

Square test pieces measuring 1 cm on a side were respectively sampled from areas of the sample at 20 cm intervals in the widthwise direction excluding 10 cm from each edge of the sample. Fiber diameter was then measured at 30 locations for each test piece with a microscope followed by calculation of the average value of the measured values (rounded to two decimal places) and using the average value as the fiber diameter of the fibers that compose the test piece.

(5) Open Pore Diameter Distribution (Mean Flow Pore Diameter and Maximum, Pore Diameter)

A Perm-Porometer manufactured by PMI Corp. (model: CFP-1200AEX) was used. Silwick manufactured by PMI Corp. was used for the immersion liquid during measurement, and the sample was measured after immersing the sample in the liquid and adequately deaerating.

The present measurement apparatus uses a filter for the sample. The filter is immersed in a liquid having a known surface tension, pressure is applied to the filter in a state in which all of the filter pores are covered with a film of the liquid, and pore diameter is calculated from the pressure at which the liquid film is disrupted and the surface tension of the liquid. The following equation was used for the calculation.

$d=C \cdot r/P$ (wherein, d (units: μm) represents the pore diameter of the filter, r (units: N/m) represents the surface tension of the liquid, P (units: Pa) represents the pressure at which the liquid film is disrupted at that pore diameter, and C represents a constant).

Here, the flow rate (wet flow rate) is measured in the case of continuously changing the pressure P applied to the filter immersed in the liquid from low pressure to high pressure. At the initial pressure, the flow rate is 0 since the liquid film of even the largest pores is not disrupted. As the pressure is raised, the liquid films of the largest pores are disrupted and flow is generated (bubble point). As the pressure is raised further, flow rate increases corresponding to each pressure. The flow rate at the pressure at which the liquid films of the smallest pores are disrupted coincides with the flow rate in the dry state (dry flow rate).

In the measurement method according to the present measurement apparatus, the value obtained by dividing the wet flow rate at a certain pressure by the dry flow rate at the same pressure is referred to as the cumulative filter flow rate (units: %). The pore diameter of a liquid film that is disrupted at a pressure at which the cumulative flow rate is 50% is referred to as the mean flow pore diameter. This mean flow pore diameter was used for the mean flow pore diameter of the laminated nonwoven fabric of the present invention.

The maximum pore diameter of the laminated nonwoven fabric of the present invention was defined as the pore diameter determined by measuring using the nonwoven fabric for the aforementioned filter sample, and taking the maximum pore diameter to be the pore diameter of a liquid film that is disrupted at pressure within a range of $-2\sigma$ of 50% of the cumulative flow rate, namely a pressure at which cumulative filter flow rate becomes 2.3%. In the aforementioned measurement method, three measurements were made for each sample and the average value thereof was taken to be the mean flow pore diameter.

(6) Tensile Strength (kg/1.5 cm)

Test pieces measuring 1.5 cm wide×20 cm long were cut out at 5 locations for every 1 m of width, excluding those portions 10 cm from each edge of the sample (nonwoven fabric). A load was applied until the test pieces broke, and the average value of strength of the test pieces in the MD direction at the maximum load was determined.

(7) Puncture Strength

Test pieces measuring 1.5 cm wide×20 cm long were cut out at 5 locations for every 1 m of width, excluding those portions 10 cm from each edge of the sample (nonwoven fabric). A compressive load was applied to the test pieces by a 100 kg ceil at 50 m/min, and the load at which the test piece was punctured was taken to be the puncture strength.

(8) Melting Point (° C.)

Measurement was carried out with the measurement instrument indicated below, and the temperature at the intersection of the asymptote of the infection point at the start of the melting peak and the baseline in a temperature region higher than Tg was taken to be the melting point A differential scanning calorimeter (DSC210, SII Nanotechnology Inc.) was used, and measurements were carried out under the conditions indicated below.

Measurement atmosphere: nitrogen gas at 50 ml/min, ramp rate: 10° C./min, measured temperature range: 25° C. to 300° C.

(9) Measurement of Wicking Height

Test pieces longer in the widthwise direction of a sample (nonwoven fabric) (measuring about 2.5 cm wide×20 cm long) were sampled at 3 locations for every 1 m of width and measured in compliance with the Byreck method described in the method for testing water absorbency of textile product in JIS L-1907. A standard solution (using a 50 mN/m wet index standard solution, to be referred to as the standard solution) was used for the absorbed solution, wicking height was measured after 10 minutes and wicking height was determined using the average value thereof.

(10) Measurement of Contact Angle

A sample (nonwoven fabric) was sampled at three locations for every 1 m of width followed by measurement of contact angle using a contact angle measuring device. A standard solution was used for the dropping solution, contact angle between 100 ms of solution and the nonwoven fabric was measured, and contact angle was determined using the average value thereof.

Next, coin cells were fabricated using the separators according to the previously described procedure and the electrical characteristics thereof were evaluated. The method used to fabricate the coin cells and the evaluation methods are indicated below.

(11) Coin Cell Fabrication

A lithium cobalt oxide (LiCoO$_2$) positive electrode having a thickness of 40 μm manufactured by Hohsen Corp. was stamped out into the shape of a circle having a diameter of 1.59 cm, a graphite negative electrode having a thickness of 50 μm manufactured by Hohsen Corp. was stamped out into the shape of a circle having a diameter of 1.62 cm, and a separator film from each of the examples and comparative examples was stamped out into the shape of a circle having a diameter of 2.4 cm, followed by superimposing the negative electrode, separator and positive electrode in that order starting from the bottom so that the positive electrode active material and negative electrode active material were in mutual opposition, and housing the assembly in a small stainless steel container provided with a cover. The container and cover were insulated, the container was in contact with copper foil of the negative electrode, and the cover was in contact with aluminum foil of the positive electrode. An electrolytic solution obtained by dissolving a solute in the form of LiPF$_6$ to a concentration of 1 M/L in a mixed solvent of ethylene carbonate and dimethyl carbonate at a ratio of 3:7 (volume ratio) within the container was injected into a coin cell and sealed therein.

(12) Evaluation of Rate Characteristics

The separator was cut out into the shape of a circle having a diameter of 18 mmϕ, the aforementioned positive electrode and negative electrode were cut out into the shape of a circle having a diameter of 16 mmϕ, the positive electrode, separator and negative electrode were superimposed in that order so that the active material sides of the positive electrode and negative electrode were in mutual opposition, and the assembly was then housed in a stainless steel container provided with a cover. The container and the cover were insulated, the container was in contact with the copper foil of the negative electrode and the cover was in contact with the aluminum foil of the positive electrode. The aforementioned nonaqueous electrolytic solution was injected into this container and sealed therein. After allowing to stand for 1 day at room temperature, the cell was charged for a total of 3 hours by a method consisting of charging to a cell voltage of 3.6 V at a constant current value of 1.1 A (1.0 C) in an atmosphere at 25° C., followed by starting to reduce the current from 1.1 A so as to retain the voltage of 3.6 V. Next, the cell was discharged to a cell voltage of 2.0 V at a current value of 1.1 A (1.0 C) or 11.0 A (10 C) to obtain the discharge capacity at 1 C or the discharge capacity at 10 C.

The proportion of the 10 C discharge capacity to the 1 C discharge capacity was defined as the capacity retention rate (%), and this was used as indicator of rate characteristics.

(13) Evaluation of Micro-Short-Circuiting

Micro-short-circuiting was defined as "OK" in the case the number of cells in which the separator short-circuited when carrying out the aforementioned measurements was 0 out of 5 and defined as "OK" in the case of even one defective cell.

The results for the electrical characteristics of the coin cells obtained in these procedures are shown in Tables 4 to 6. Furthermore, the test results of the examples and comparative examples shown here indicate the average of five coin cells.

The aforementioned results are shown in Tables 1 to 6.

TABLE 1

| | Layer Configuration | | | | | | | | | | | | Forming Conditions | |
|---|---|---|---|---|---|---|---|---|---|---|---|---|---|---|
| | Layer I | | | | Layer II | | | | | Layer I | | | Flat roll joining conditions Upper: coated side, lower: uncoated side | Calendaring conditions Upper: coated side, lower: uncoated side |
| Parameter units | Fiber type | Fiber diameter μm | Fiber amount g/m² | Melting point °C. | Fiber type | Fiber diameter μm | Fiber amount g/m² | Weight ratio % | Melting point °C. | Fiber type | Fiber diameter μm | Fiber amount g/m² | Melting point °C. | Temp. upper/ lower °C. | Temp. upper/ lower °C. |
| Ex. 1 | PET/MB | 1.6 | 5.00 | 260 | PET/SB | 12.0 | 5.00 | 50 | 260 | PET/MB | 1.6 | 5.00 | 260 | 120/140 | 70/70 |
| Ex. 2 | PET/MB | 1.6 | 6.00 | 260 | PET/SB | 12.0 | 6.00 | 50 | 260 | PET/MB | 1.6 | 6.00 | 260 | 140/140 | 100/100 |
| Ex. 3 | PET/MB | 0.3 | 2.00 | 260 | PET/SB | 12.0 | 2.00 | 50 | 260 | PET/MB | 0.3 | 2.00 | 260 | 90/90 | 50/50 |
| Ex. 4 | PET/MB | 1.6 | 5.00 | 260 | PET/SB | 12.0 | 5.00 | 50 | 260 | PET/MB | 1.6 | 5.00 | 260 | 100/100 | 40/40 |
| Ex. 5 | PET/MB | 1.6 | 5.00 | 260 | PET/SB | 12.0 | 5.00 | 50 | 260 | PET/MB | 1.6 | 5.00 | 260 | 140/140 | 70/70 |
| Ex. 6 | PET/MB | 1.6 | 5.00 | 260 | PET/SB | 12.0 | 5.00 | 50 | 260 | PET/MB | 1.6 | 5.00 | 260 | 115/115 | 70/70 |
| Ex. 7 | PET/MB | 1.6 | 5.00 | 260 | PET/SB | 20.0 | 5.00 | 50 | 260 | PET/MB | 1.6 | 5.00 | 260 | 125/125 | 70/70 |
| Ex. 8 | PET/MB | 3.5 | 5.00 | 260 | PET/SB | 8.0 | 5.00 | 50 | 260 | PET/MB | 3.5 | 5.00 | 260 | 120/120 | 75/75 |
| Ex. 9 | PET/MB | 0.3 | 5.00 | 260 | PET/SB | 16.0 | 5.00 | 50 | 260 | PET/MB | 0.3 | 5.00 | 260 | 120/120 | 60/60 |
| Ex. 10 | PET/MB | 1.6 | 6.80 | 260 | PET/SB | 16.0 | 1.36 | 9 | 260 | PET/MB | 1.6 | 6.80 | 260 | 140/140 | 100/100 |
| Ex. 11 | PET/MB | 0.3 | 1.36 | 260 | PET/SB | 12.0 | 12.28 | 91 | 260 | PET/MB | 0.3 | 1.36 | 260 | 130/130 | 70/70 |
| Ex. 12 | PET/MB | 1.6 | 2.50 | 260 | co-PET: PET | 16.0 | 10.00 | 50 | 160: 260 | PET/MB | 1.6 | 2.50 | 260 | 90/90 | 50/50 |
| Ex. 13 | PPS/MB | 1.6 | 5.00 | 285 | PPS/MB | 12.0 | 5.00 | 50 | 285 | PPS/MB | 1.6 | 5.00 | 285 | 150/150 | 70/70 |
| Ex. 14 | PP/MB | 1.6 | 5.00 | 260 | PP/SB | 12.0 | 5.00 | 50 | 160 | PP/MB | 1.6 | 5.00 | 260 | 90/90 | 40/40 |
| Ex. 15 | PET/MB | 1.6 | 5.00 | 260 | PET/SB | 12.0 | 5.00 | 50 | 260 | PET/MB | 1.6 | 5.00 | 260 | 120/120 | 70/70 |
| Ex. 16 | PET/MB | 1.6 | 2.50 | 260 | PET/SB | 12.0 | 5.00 | 50 | 260 | PET/MB | 1.6 | 2.50 | 260 | 120/120 | 70/70 |

TABLE 1-continued

| Parameter units | Layer Configuration ||||||||||| Forming Conditions |||
| | Layer II ||| Layer I |||| Layer II ||| Flat roll joining conditions Upper: coated side, lower: uncoated side | Calendaring conditions Upper: coated side, lower: uncoated side |
| | Fiber type | Fiber diameter μm | Fiber amount g/m² | Melting point °C | Fiber type | Fiber diameter μm | Fiber amount g/m² | Weight ratio % | Melting point °C | Fiber type | Fiber diameter μm | Fiber amount g/m² | Melting point °C | Temp. upper/lower °C | Temp. upper/lower °C |
|---|---|---|---|---|---|---|---|---|---|---|---|---|---|---|---|
| Ex. 17 | PET/SB | 12.0 | 5.00 | 260 | PET/MB | 0.3 | 10.00 | 50 | 260 | | | — | | 50/140 | 50/190 |
| Ex. 18 | PET/SB | 12.0 | 5.00 | 260 | PET/MB | 0.3 | 10.00 | 50 | 260 | | | — | | 50/140 | 50/190 |
| Ex. 19 | PET/SB | 12.0 | 6.30 | 260 | PET/MB | 0.3 | 2.50 | 12 | 260 | PET/SB | 12.0 | 6.30 | 260 | 140/140 | 200/200 |
| Ex. 20 | PET/SB | 12.0 | 6.25 | 260 | PET/MB | 1.6 | 2.50 | 12 | 260 | PET/SB | 12.0 | 6.30 | 260 | 140/140 | 200/200 |
| Ex. 21 | PET/SB | 12.0 | 3.80 | 260 | PET/MB | 1.6 | 2.50 | 12 | 260 | PET/SB | 12.0 | 3.80 | 260 | 140/140 | 200/200 |

In Example 1 to 21, a dispersion plate was not used during production of layer II. Linear pressures of the flat roll and calendar roll were 260 N/cm and 350 N/cm, respectively.

TABLE 2

| Parameter units | Layer Configuration ||||||||||| Forming Conditions |||
| | Layer I ||| Layer II |||| Layer I ||| Flat roll joining conditions Upper: coated side, lower: uncoated side | Calendaring conditions Upper: coated side, lower: uncoated side |
| | Fiber type | Fiber diameter μm | Fiber amount g/m² | Melting point °C | Fiber type | Fiber diameter μm | Fiber amount g/m² | Weight ratio % | Melting point °C | Fiber type | Fiber diameter μm | Fiber amount g/m² | Melting point °C | Temp. upper/lower °C | Temp. upper/lower °C |
|---|---|---|---|---|---|---|---|---|---|---|---|---|---|---|---|
| Ex. 22 | PET/MB | 1.6 | 5.00 | 260 | PET/SB | 12.0 | 5.00 | 50 | 260 | PET/MB | 1.6 | 5.00 | 260 | 120/140 | 70/70 |
| Ex. 23 | PET/MB | 1.6 | 6.00 | 260 | PET/SB | 12.0 | 6.00 | 50 | 260 | PET/MB | 1.6 | 6.00 | 260 | 140/140 | 100/100 |
| Ex. 24 | PET/MB | 0.3 | 2.00 | 260 | PET/SB | 12.0 | 2.00 | 50 | 260 | PET/MB | 0.3 | 2.00 | 260 | 90/90 | 50/50 |
| Ex. 25 | PET/MB | 1.6 | 5.00 | 260 | PET/SB | 12.0 | 5.00 | 50 | 260 | PET/MB | 1.6 | 5.00 | 260 | 100/100 | 40/40 |
| Ex. 26 | PET/MB | 1.6 | 5.00 | 260 | PET/SB | 12.0 | 5.00 | 50 | 260 | PET/MB | 1.6 | 5.00 | 260 | 140/140 | 70/70 |
| Ex. 27 | PET/MB | 1.6 | 5.00 | 260 | PET/SB | 20.0 | 5.00 | 50 | 260 | PET/MB | 1.6 | 5.00 | 260 | 115/115 | 70/70 |
| Ex. 28 | PET/MB | 1.6 | 5.00 | 260 | PET | 8.0 | 5.00 | 50 | 260 | PET/MB | 1.6 | 5.00 | 260 | 125/125 | 70/70 |
| Ex. 29 | PET/MB | 3.5 | 5.00 | 260 | PET/SB | 16.0 | 5.00 | 50 | 260 | PET/MB | 3.5 | 5.00 | 260 | 120/120 | 75/75 |
| Ex. 30 | PET/MB | 0.3 | 5.00 | 260 | PET/SB | 16.0 | 5.00 | 50 | 260 | PET/MB | 0.3 | 5.00 | 260 | 120/120 | 60/60 |
| Ex. 31 | PET/MB | 1.6 | 6.80 | 260 | PET/SB | 16.0 | 1.36 | 9 | 260 | PET/MB | 1.6 | 6.80 | 260 | 140/140 | 100/100 |
| Ex. 32 | PET/MB | 0.3 | 1.36 | 260 | PET/SB | 12.0 | 12.28 | 91 | 260 | PET/MB | 0.3 | 1.36 | 260 | 130/130 | 70/70 |
| Ex. 33 | PET/MB | 1.6 | 2.50 | 260 | co-PET:PET | 16.0 | 10.00 | 50 | 160:260 | PET/MB | 1.6 | 2.50 | 260 | 90/90 | 50/50 |
| Ex. 34 | PP/MB | 1.6 | 5.00 | 260 | PP/SB | 12.0 | 5.00 | 50 | 160 | PP/MB | 1.6 | 5.00 | 260 | 90/90 | 40/40 |
| Ex. 35 | PET/MB | 1.6 | 5.00 | 260 | PET/SB | 12.0 | 5.00 | 50 | 260 | PET/MB | 1.6 | 5.00 | 260 | 120/120 | 70/70 |
| Ex. 36 | PET/MB | 1.6 | 2.50 | 260 | PET/SB | 12.0 | 5.00 | 50 | 260 | PET/MB | 1.6 | 2.50 | 260 | 120/120 | 70/70 |
| | Layer II ||| Layer I |||| Layer II ||| | |
| Ex. 37 | PET/SB | 12.0 | 5.00 | 260 | PET/MB | 0.3 | 10.00 | 50 | 260 | | | — | | 50/140 | 50/190 |
| Ex. 38 | PET/SB | 12.0 | 5.00 | 260 | PET/MB | 0.3 | 10.00 | 50 | 260 | | | — | | 50/140 | 50/190 |
| Ex. 39 | PET/SB | 12.0 | 6.30 | 260 | PET/MB | 0.3 | 2.50 | 17 | 260 | PET/SB | 12.0 | 6.30 | 260 | 140/140 | 200/200 |
| Ex. 40 | PET/SB | 12.0 | 6.25 | 260 | PET/MB | 1.6 | 2.50 | 17 | 260 | PET/SB | 12.0 | 6.30 | 260 | 140/140 | 200/200 |
| Ex. 41 | PET/SB | 12.0 | 3.80 | 260 | PET/MB | 1.6 | 2.50 | 25 | 260 | PET/SB | 12.0 | 3.80 | 260 | 140/140 | 200/200 |
| Ex. 42 | PET/SB | 12.0 | 3.80 | 260 | PET/MB | 1.6 | 2.50 | 25 | 260 | PET/SB | 12.0 | 3.80 | 260 | 140/140 | 200/200 |
| Ex. 43 | PET/SB | 12.0 | 3.80 | 260 | PET/MB | 1.6 | 2.50 | 25 | 260 | PET/SB | 12.0 | 3.80 | 260 | 140/140 | 220/210 |
| Ex. 44 | PET/SB | 12.0 | 3.00 | 260 | PET/MB | 1.6 | 2.00 | 25 | 260 | PET/SB | 12.0 | 3.00 | 260 | 140/140 | 210/220 |
| Ex. 45 | PET/SB | 12.0 | 3.80 | 260 | PET/MB | 0.3 | 2.50 | 25 | 260 | PET/SB | 12.0 | 3.80 | 260 | 140/140 | 220/210 |
| Ex. 46 | PET/SB | 12.0 | 3.00 | 260 | PET/MB | 0.8 | 4.00 | 40 | 260 | PET/SB | 12.0 | 3.00 | 260 | 140/140 | 220/210 |
| Ex. 47 | PET/SB | 8.0 | 2.50 | 260 | PET/MB | 1.2 | 5.00 | 50 | 260 | PET/SB | 12.0 | 2.50 | 260 | 140/140 | 220/210 |
| Ex. 48 | PET/SB | 12.0 | 3.80 | 260 | PET/MB | 0.3 | 2.50 | 25 | 260 | PET/SB | 12.0 | 3.80 | 260 | 140/140 | 220/210 |

TABLE 2-continued

| | Layer Configuration | | | | | | | | | | | | Forming Conditions | |
|---|---|---|---|---|---|---|---|---|---|---|---|---|---|---|
| | | | | | | | | | | | | | Flat roll joining conditions Upper: coated side, lower: uncoated side | Calendaring conditions Upper: coated side, lower: uncoated side |
| Parameter units | Fiber type | Fiber diameter μm | Fiber amount g/m² | Melting point °C. | Fiber type | Fiber diameter μm | Fiber amount g/m² | Weight ratio % | Melting point °C. | Fiber type | Fiber diameter μm | Fiber amount g/m² | Melting point °C. | Temp. upper/lower °C. | Temp. upper/lower °C. |
| Ex. 49 | PET/SB | 12.0 | 3.00 | 260 | PET/MB | 0.8 | 4.00 | 40 | 260 | PET/SB | 12.0 | 3.00 | 260 | 140/140 | 220/210 |
| Ex. 50 | PET/SB | 8.0 | 2.50 | 260 | PET/MB | 1.6 | 5.00 | 50 | 260 | PET/SB | 12.0 | 2.50 | 260 | 140/140 | 220/210 |

In Examples 22 to 50, a dispersion plate was used during production of layer II. In Example 21 to 41, linear pressures of the flat roll calender roll were 260 N/cm and 350 N/cm, respectively. In Examples 42 to 50, linear pressures of the flat roll calender roll were 260 N/cm and 500 N/cm, respectively.

TABLE 3

| | Configuration | | | | | | | | | | | | | Forming Conditions | | | |
|---|---|---|---|---|---|---|---|---|---|---|---|---|---|---|---|---|---|
| | | | | | | | | | | | | | | Flat roll joining conditions Upper: coated side, lower: uncoated side | | Calendering conditions Upper: coated side, lower: uncoated side | |
| Parameter Units | Fiber type | Fiber diameter μm | Fiber amt. g/m² | Melting point °C. | Fiber type | Fiber diameter μm | Fiber amt. g/m² | Wt. ratio | Melting point °C. | Fiber type | Fiber diameter μm | Fiber amt. g/m² | Melting point °C. | Pressure N/cm | Temp. Upper/lower °C. | Pressure N/cm | Temp. Upper/lower °C. |
| Comp Ex. 1 | PET/SB | 16.0 | 25 | 260 | — | | | | | — | | | | 260 | 190/190 | 380 | 245/245 |
| Comp Ex. 2 | | | | | PET/MB | 1.6 | 25 | 100 | 260 | — | — | 0 | — | 260 | 120/120 | 340 | 40/40 |
| Comp Ex. 3 | PET/SB | 12.0 | 8.3 | 260 | PET/MB | 0.3 | 3.4 | 12 | 260 | PET/SB | 12.0 | 8.3 | 260 | 260 | 140/140 | 350 | 210/210 |
| Comp Ex. 4 | PET | 16.0 | 25 | 260 | — | | | | | — | | | | — | — | 250 | 120/120 |
| Comp Ex. 5 | Rayon | 8.0 | 16.0 | 260 | — | | | | | — | | | | — | — | — | — |
| Comp Ex. 6 | PE | — | — | — | — | | | | | — | | | | — | — | — | — |
| Comp Ex. 7 | PET | 8.0 | 12 | 260 | — | | | | | — | | | | — | — | 250 | 120/120 |
| Comp Ex. 8 | PET | 8.0 | 8.0 | 260 | — | | | | | — | | | | — | — | 250 | 120/120 |
| Comp Ex. 9 | PET | 8.0 | 8.0 | 260 | — | | | | | — | | | | — | — | 250 | 120/120 |

In Comp. Ex. 1 to 9, a dispersion plate was not used during production of layer II.

TABLE 4

| Parameter Units | Basis weight g/m² | Thickness μm | Apparent density g/cm³ | Texture coefficient of variation | Strength Avg. N/15 mm | Puncture strength | Mean flow pore diameter μm | Wicking height mm | Contact angle Top/bottom | Inorganic coating | Micro-short-circulating Judgement | Rate characteristics 10 C/1 C retention rate % |
|---|---|---|---|---|---|---|---|---|---|---|---|---|
| Ex. 1 | 15 | 26.0 | 0.58 | 2.04 | 9.0 | 212 | 9.7 | 33 | 18/20 | | OK | 52 |
| Ex. 2 | 18 | 32.5 | 0.55 | 2.10 | 12.1 | 302 | 8.2 | 40 | 17/15 | | OK | 42 |
| Ex. 3 | 6 | 10.1 | 0.59 | 1.88 | 6.0 | 169 | 11.5 | 18 | 19/13 | | OK | 55 |
| Ex. 4 | 15 | 43.0 | 0.35 | 2.08 | 9.3 | 237 | 9.6 | 27 | 22/17 | | OK | 35 |
| Ex. 5 | 15 | 20.0 | 0.75 | 2.00 | 9.2 | 199 | 9.3 | 48 | 19/18 | | OK | 36 |
| Ex. 6 | 15 | 26.7 | 0.56 | 2.31 | 8.9 | 203 | 9.9 | 29 | 20/16 | | OK | 43 |
| Ex. 7 | 15 | 25.5 | 0.59 | 1.80 | 9.7 | 233 | 9.3 | 37 | 18/21 | | OK | 55 |

TABLE 4-continued

| Parameter Units | Basis weight g/m² | Thickness μm | Apparent density g/cm³ | Texture coefficient of variation | Strength Avg. N/15 mm | Puncture strength | Mean flow pore diameter μm | Wicking height mm | Contact angle Top/bottom | Inorganic coating | Micro-short-circulating Judgement | Rate characteristics 10 C/1 C retention rate % |
|---|---|---|---|---|---|---|---|---|---|---|---|---|
| Ex. 8 | 15 | 26.4 | 0.57 | 2.18 | 9.2 | 211 | 11.1 | 20 | 15/19 | | OK | 47 |
| Ex. 9 | 15 | 26.2 | 0.57 | 1.74 | 8.7 | 217 | 9.1 | 39 | 18/18 | | OK | 64 |
| Ex. 10 | 15 | 26.1 | 0.57 | 1.98 | 4.7 | 277 | 7.9 | 49 | 17/15 | | OK | 58 |
| Ex. 11 | 15 | 26.0 | 0.58 | 2.28 | 2.8 | 198 | 15.5 | 22 | 22/19 | | OK | 51 |
| Ex. 12 | 15 | 34.3 | 0.44 | 1.00 | 13.1 | 233 | 3.1 | 33 | 43/45 | | OK | 40 |
| Ex. 13 | 15 | 28.0 | 0.54 | 2.41 | 9.3 | 231 | 10.2 | 30 | 27/25 | | OK | 51 |
| Ex. 14 | 15 | 28.0 | 0.54 | 2.31 | 9.1 | 206 | 10.1 | 31 | 19/19 | | OK | 48 |
| Ex. 15 | 15 | 35.0 | 0.43 | 2.04 | 9.4 | 347 | 5.2 | 35 | 16/15 | OK | OK | 63 |
| Ex. 16 | 10 | 22.0 | 0.45 | 2.10 | 9.5 | 309 | 4.9 | 33 | 19/16 | OK | OK | 62 |
| Ex. 17 | 15 | 49.5 | 0.30 | 1.88 | 25.0 | 219 | 6.0 | 22 | 55/31 | | OK | 40 |
| Ex. 18 | 15 | 49.2 | 0.30 | 1.83 | 24.8 | 224 | 6.0 | 23 | 51/32 | OK | OK | 42 |
| Ex. 19 | 15 | 32.0 | 0.47 | 2.07 | 27.0 | 399 | 9.7 | 21 | 52/59 | | OK | 44 |
| Ex. 20 | 15 | 35.0 | 0.43 | 2.04 | 32.0 | 403 | 5.2 | 13 | 33/40 | OK | OK | 41 |
| Ex. 21 | 10 | 31.8 | 0.31 | 2.02 | 10.3 | 222 | 6.3 | 15 | 35/39 | OK | OK | 71 |

TABLE 5

| Parameter | Basis weight | Thickness | Apparent density | Texture coefficient of variation | Strength Avg. | Puncture strength | Mean flow pore diameter | Wicking height | Contact angle Top/bottom | Inorganic coating | Micro-short-circulating | Rate chariacteristics 10 C/1 C retention rate |
|---|---|---|---|---|---|---|---|---|---|---|---|---|
| Ex. 22 | 15 | 26 | 0.58 | 1.52 | 10.5 | 251 | 8.9 | 33 | 19/23 | | OK | 62 |
| Ex. 23 | 18 | 32.5 | 0.55 | 1.58 | 14.5 | 303 | 8.0 | 40 | 13/16 | | OK | 53 |
| Ex. 24 | 6 | 10.1 | 0.59 | 1.43 | 8.4 | 201 | 11.2 | 18 | 21/15 | | OK | 59 |
| Ex. 25 | 15 | 43.0 | 0.35 | 1.60 | 11.1 | 271 | 9.1 | 27 | 22/13 | | OK | 48 |
| Ex. 26 | 15 | 20.0 | 0.75 | 1.58 | 10.6 | 221 | 9.1 | 48 | 17/19 | | OK | 50 |
| Ex. 27 | 15 | 26.7 | 0.56 | 1.68 | 10.4 | 253 | 9.4 | 29 | 21/15 | | OK | 52 |
| Ex. 28 | 15 | 25.5 | 0.59 | 1.56 | 11.1 | 281 | 9.3 | 37 | 19/20 | | OK | 65 |
| Ex. 29 | 15 | 26.4 | 0.57 | 1.63 | 11.4 | 231 | 10.2 | 20 | 13/16 | | OK | 57 |
| Ex. 30 | 15 | 26.2 | 0.57 | 1.37 | 10.9 | 241 | 9.0 | 39 | 16/19 | | OK | 70 |
| Ex. 31 | 15 | 26.1 | 0.57 | 1.39 | 6.7 | 299 | 7.4 | 49 | 12/18 | | OK | 62 |
| Ex. 32 | 15 | 26.0 | 0.58 | 1.62 | 5.2 | 226 | 14.2 | 22 | 27/20 | | OK | 60 |
| Ex. 33 | 15 | 34.3 | 0.44 | 1.64 | 16.2 | 271 | 2.9 | 33 | 41/44 | | OK | 55 |
| Ex. 34 | 15 | 28.0 | 0.54 | 1.68 | 11.4 | 241 | 9.3 | 31 | 18/19 | | OK | 58 |
| Ex. 35 | 15 | 35.0 | 0.43 | 1.52 | 11.7 | 371 | 5.3 | 35 | 15/19 | | OK | 65 |
| Ex. 36 | 10 | 22.0 | 0.45 | 1.56 | 9.7 | 332 | 4.0 | 33 | 15/19 | OK | OK | 69 |
| Ex. 37 | 15 | 49.5 | 0.30 | 1.42 | 29.0 | 262 | 5.4 | 22 | 23/22 | OK | OK | 50 |
| Ex. 38 | 15 | 49.5 | 0.30 | 1.44 | 27.1 | 251 | 5.8 | 22 | 51/49 | | OK | 55 |
| Ex. 39 | 15 | 32.0 | 0.47 | 1.51 | 29.1 | 459 | 9.2 | 21 | 43/45 | OK | OK | 53 |
| Ex. 40 | 15 | 35.0 | 0.43 | 1.49 | 35.1 | 446 | 5.4 | 13 | 62/57 | | OK | 50 |
| Ex. 41 | 10 | 31.8 | 0.31 | 1.50 | 12.1 | 261 | 6.2 | 15 | 20/41 | OK | OK | 73 |
| Ex. 42 | 10 | 20.1 | 0.50 | 1.42 | 11.7 | 281 | 7.9 | 13 | 38/29 | OK | OK | 64 |
| Ex. 43 | 10 | 16.2 | 0.63 | 1.47 | 12.4 | 331 | 6.1 | 13 | 31/42 | OK | OK | 65 |
| Ex. 44 | 8 | 12.5 | 0.67 | 1.52 | 10.1 | 293 | 8.5 | 10 | 34/35 | OK | OK | 70 |
| Ex. 45 | 10 | 20.8 | 0.48 | 1.35 | 11.2 | 341 | 2.1 | 15 | 35/45 | OK | OK | 62 |
| Ex. 46 | 10 | 19.2 | 0.52 | 1.27 | 10.9 | 361 | 1.9 | 18 | 31/35 | | OK | 66 |
| Ex. 47 | 10 | 19.6 | 0.51 | 1.16 | 10.8 | 391 | 3.7 | 19 | 36/33 | | OK | 69 |
| Ex. 48 | 10 | 20.5 | 0.49 | 1.38 | 11.8 | 338 | 2.5 | 14 | 38/36 | OK | OK | 61 |
| Ex. 49 | 10 | 19.1 | 0.52 | 1.31 | 11.4 | 356 | 2.1 | 19 | 32/39 | OK | OK | 67 |
| Ex. 50 | 10 | 18.9 | 0.53 | 1.24 | 11.2 | 381 | 3.5 | 18 | 35/39 | OK | OK | 72 |

TABLE 6

| Parameter | Basis weight | Thickness | Apparent density | Texture coefficient of variation | Strength Avg. | Puncture strength | Mean flow pore diameter | Wicking height | Contact angle Top/bottom | Inorganic coating | Micro-short-circulating | Rate characteristics 10 C/1 C retention rate |
|---|---|---|---|---|---|---|---|---|---|---|---|---|
| Comp. Ex. 1 | 25 | 112.0 | 0.22 | 2.73 | 56.0 | 409 | 40.2 | 0 | 58/59 | | NG | 24 |
| Comp. Ex. 2 | 25 | 38.0 | 0.66 | 1.21 | 5.0 | 88 | 5.2 | 0 | 32/29 | | NG | 54 |
| Comp. Ex. 3 | 20 | 35.0 | 0.57 | 2.35 | 35.0 | 250 | 7.8 | 28 | 20/23 | | NG | 43 |
| Comp. Ex. 4 | 33 | 42.3 | 0.59 | 0.82 | 32.0 | 150 | 40.1 | 40 | 12/19 | | NG | 42 |
| Comp. Ex. 5 | 16 | 43.0 | 0.37 | 1.04 | 36.2 | 177 | — | 53 | 15/13 | | OK | 76 |
| Comp. Ex. 6 | 15 | 24.3 | 0.62 | — | 37.0 | 352 | <1 | 51 | 14/13 | | OK | 45 |
| Comp. Ex. 7 | 16 | 25.0 | 0.54 | 0.91 | 18.3 | 137 | 10.2 | 49 | 15/16 | | NG | 73 |

TABLE 6-continued

| Parameter | Basis weight | Thickness | Apparent density | Texture coefficient of variation | Strength Avg. | Puncture strength | Mean flow pore diameter | Wicking height | Contact angle Top/bottom | Inorganic coating | Micro-short-circulating | Rate characteristics 10 C/1 C retention rate |
|---|---|---|---|---|---|---|---|---|---|---|---|---|
| Comp. Ex. 8 | 10 | 20.0 | 0.64 | 0.94 | 17.2 | 98 | 14.7 | 41 | 14/14 | | NG | 79 |
| Comp. Ex. 9 | 10 | 20.0 | 0.64 | 0.94 | 7.5 | 104 | 14.6 | 43 | 13/19 | OK | OK | 79 |

Furthermore, in Tables 1 to 3, PET represents polyethylene terephthalate, MB indicates a melt blown web and SB indicates a spunbonded web.

As is clear from Tables 4 to 6, battery performance according to the examples of the present invention demonstrated superior performance in comparison with that of the comparative examples at least with respect to several parameters. In the case of paper formed into sheets in the manner of Comparative Examples 8 and 9, although the coefficient of variation of texture was favorable and battery performance was high, due to the use of short fibers, high strength was unable to be retained, thereby resulting in concerns over the occurrence of defects caused by breakage and the like during inorganic coating treatment or battery fabrication.

INDUSTRIAL APPLICABILITY

Application examples of the present invention include use in separators for electrochemical elements of all types of primary batteries and secondary batteries, and particularly those of the alkaline metal type such as lithium, lithium ion, lithium polymer and alkaline earth-types.

Electrical devices using the separator of the present invention are preferably used in various electronic equipment fields.

DESCRIPTION OF REFERENCE NUMERALS

1 Nonwoven fabric layer composed of microfibers
2 Nonwoven fabric layer
3 Laminated nonwoven fabric
10 Spinneret
20 Expelled filaments
30 Air aspirators
40 Consecutively connected channels
50 Corona charging channel device
60 Dispersion plate
70 Charging filaments
80 Collecting surface
90 Web
100 Spunbonded nonwoven fabric production apparatus

The invention claimed is:

1. A separator composed of at least two layers of laminated nonwoven fabric comprising:

a nonwoven fabric layer (layer I), composed of synthetic fibers having a fiber diameter of 0.1 μm to less than 4.0 μm, and a nonwoven fabric layer (layer II), composed of a thermoplastic resin fibers having a fiber diameter of 4.0 μm to 30 μm;

wherein, the basis weight thereof is 3.0 g/m² to less than 20.0 g/m², wherein the laminated nonwoven fabric is composed nonwoven fabric, laminate in which the coefficient of variation of the texture of the nonwoven fabric is less than 1.7, and wherein the separator is set in an electrochemical cell or an electrical energy storage device in which an electrolytic solution is injected.

2. The separator according to claim 1, wherein the layer I is present as an intermediate layer between two of the layers II.

3. The separator according to claim 1, wherein the layer II is present as an intermediate layer between two of the layers I.

4. The separator according to any one of claims 1 to 3, wherein the thermoplastic resin fibers in the nonwoven fabric layer (layer II) are thermoplastic synthetic continuous long fibers.

5. The separator according to claim 1, wherein the laminated nonwoven fabric is formed by integrating by chemical and/or thermal bonding.

6. The separator according to claim 1, wherein the laminated nonwoven fabric has a thickness of 10 μm to 50 μm.

7. The separator according to claim 1, wherein the nonwoven fabric layer (layer I) is formed by melt-blowing.

8. The separator according to claim 4, wherein the ratio (i)/(ii) of the basis weight (i) of the nonwoven fabric layer (layer I) to the basis weight (ii) of the nonwoven fabric layer (layer II) in the laminated nonwoven fabric is 1/10 to 10/1.

9. The separator according to claim 1, wherein the laminated nonwoven fabric is calendered.

10. The separator according to claim 1, wherein the laminated nonwoven fabric is hydrophilized.

11. The separator according to claim 1, wherein an inorganic material is compounded in the laminated nonwoven fabric.

12. An electrochemical cell or energy storage device that uses the separator according to claim 1.

* * * * *